INVENTOR
DANIEL LUCIEN CHARLES MAURICE BIENAIME
BY
Kenyon & Kenyon
ATTORNEYS

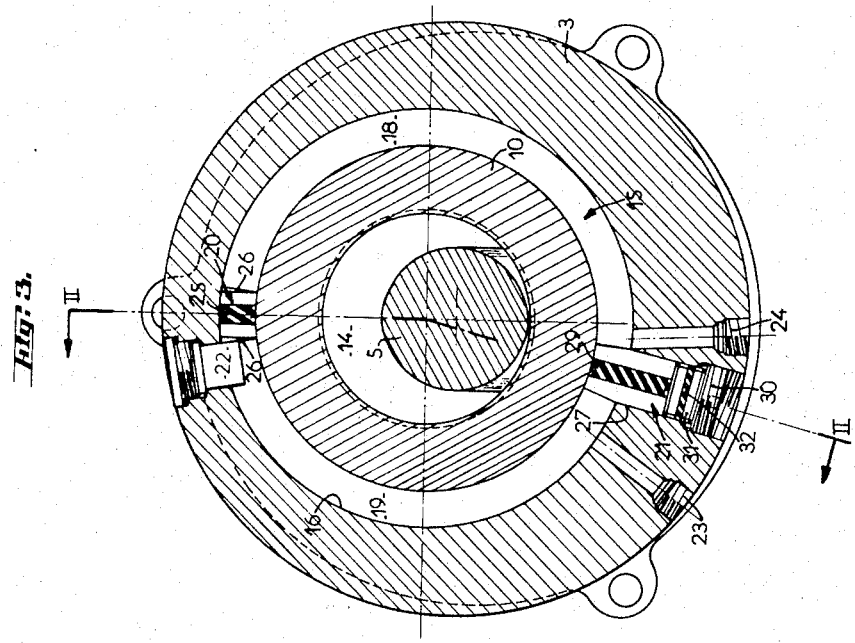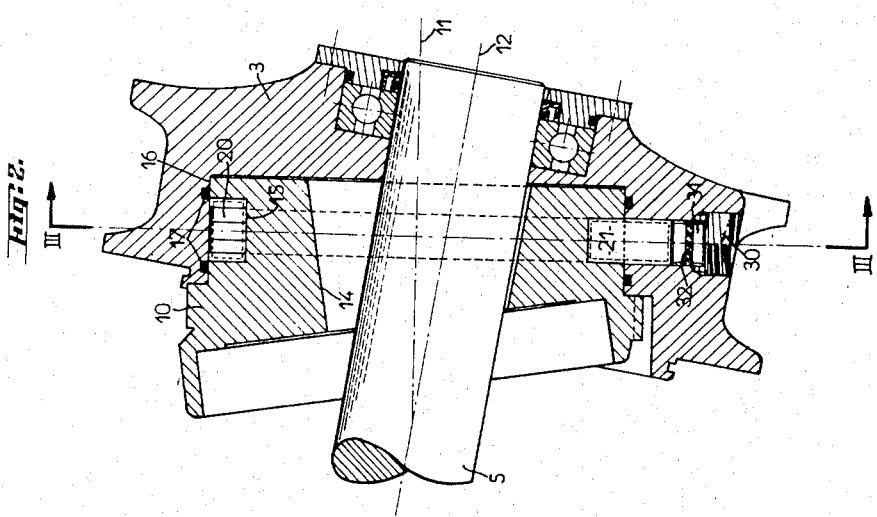

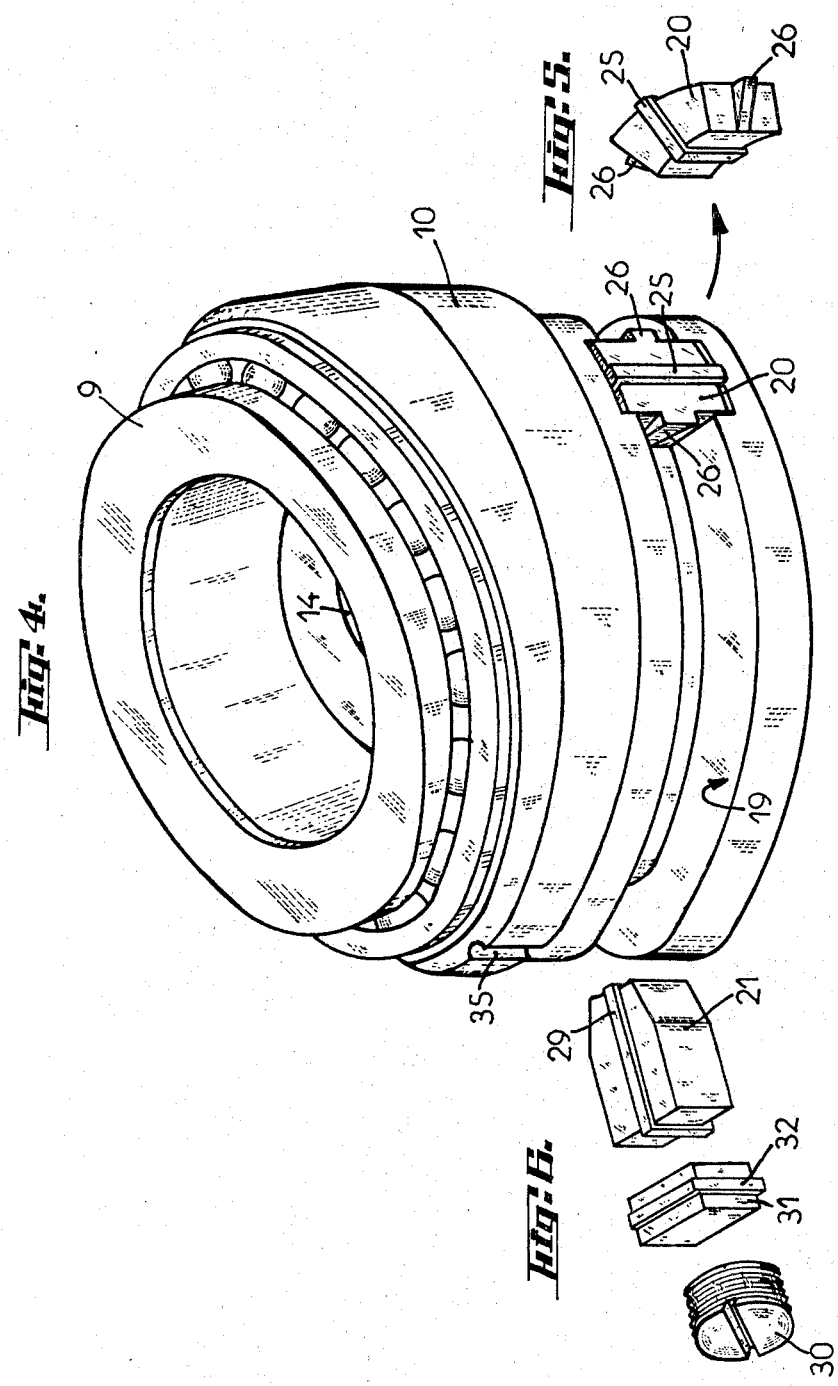

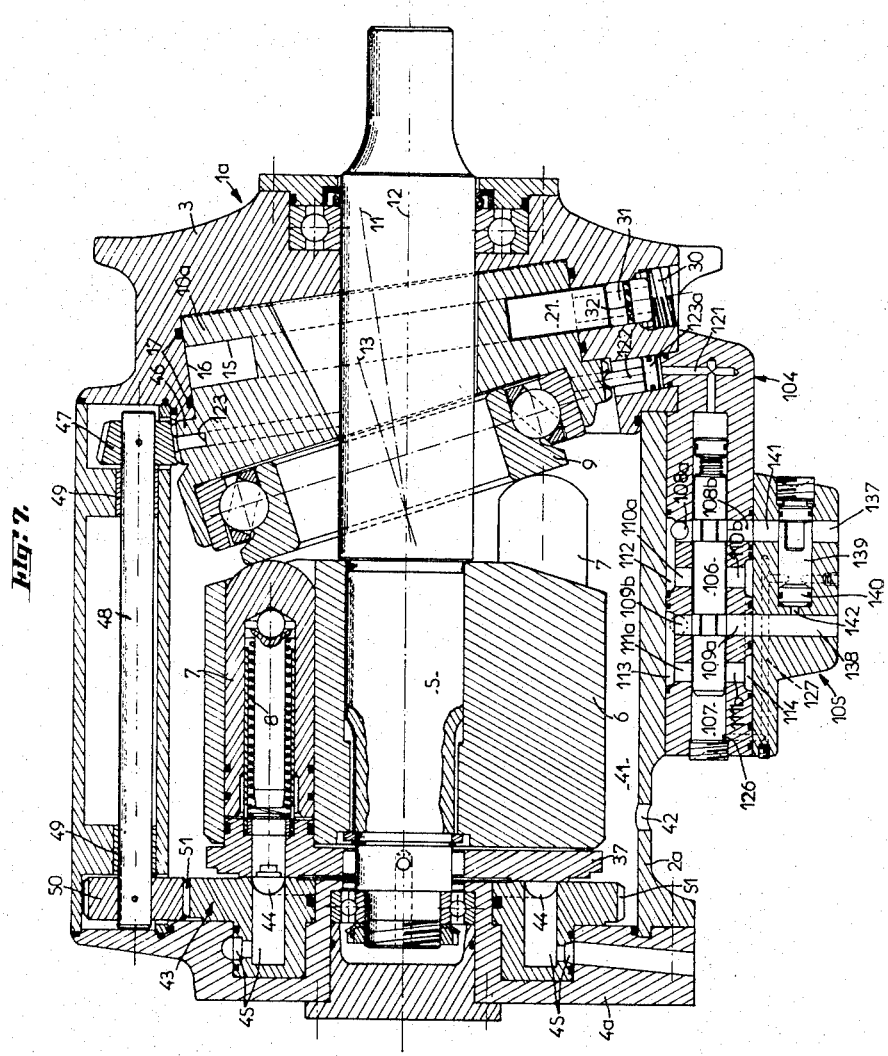

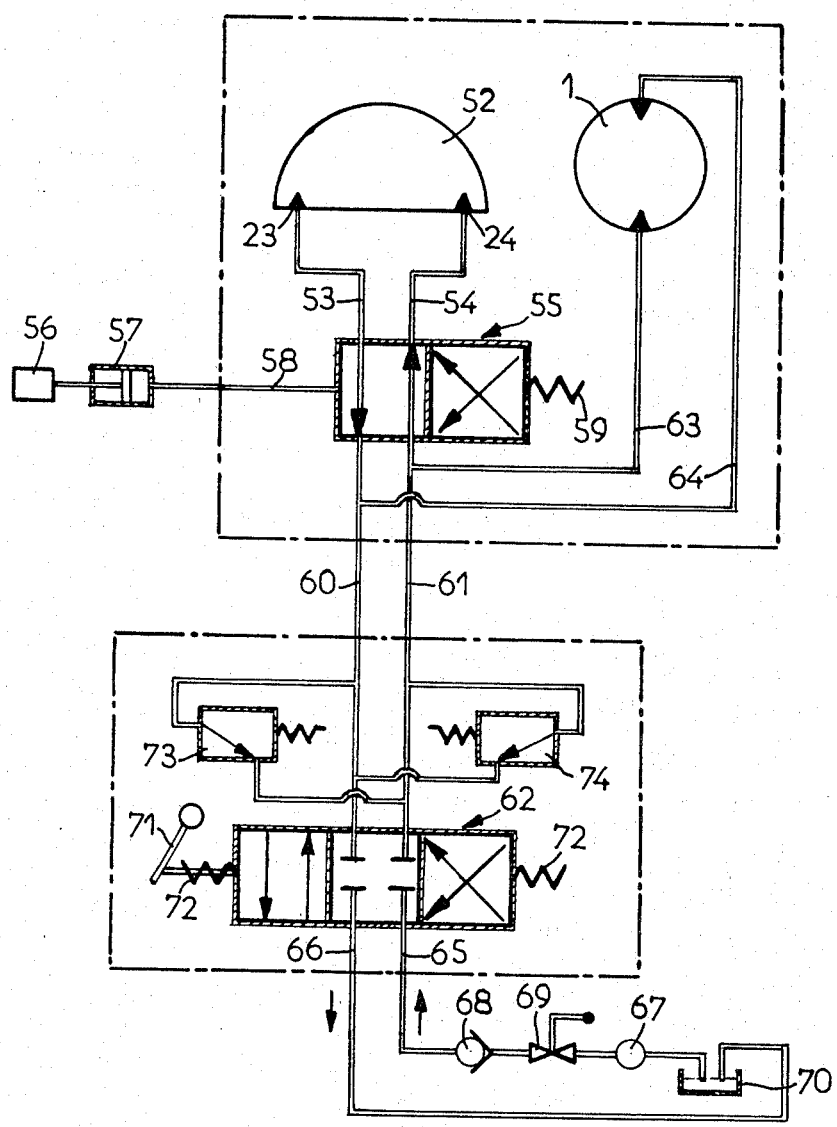

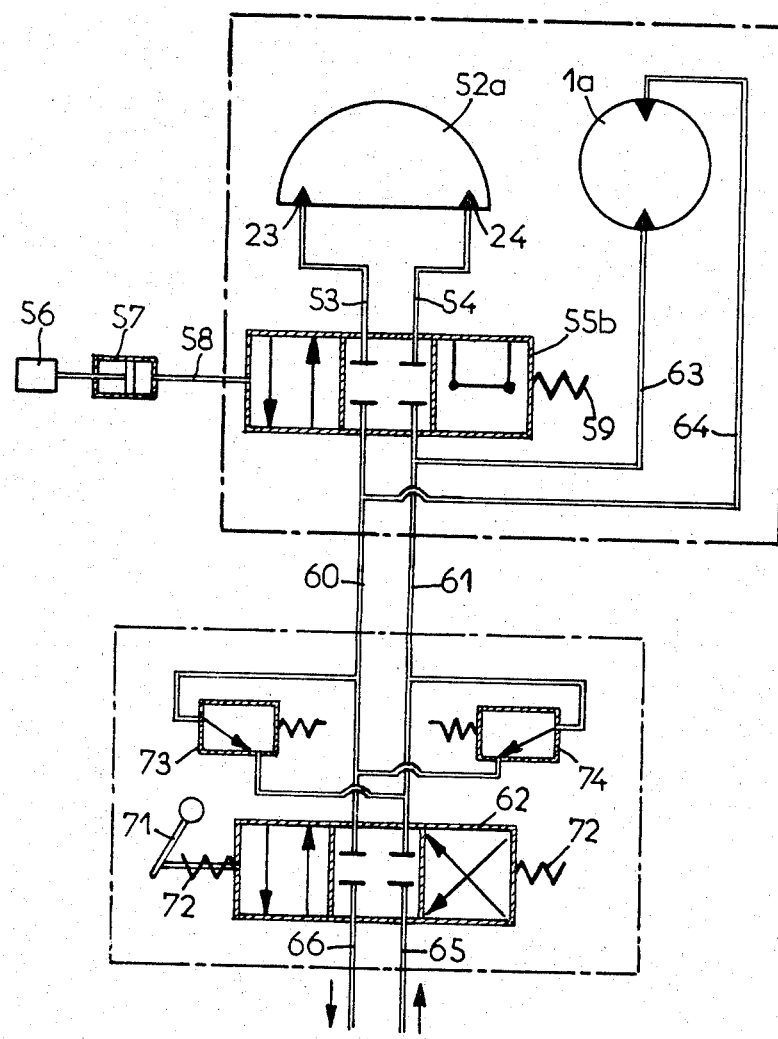

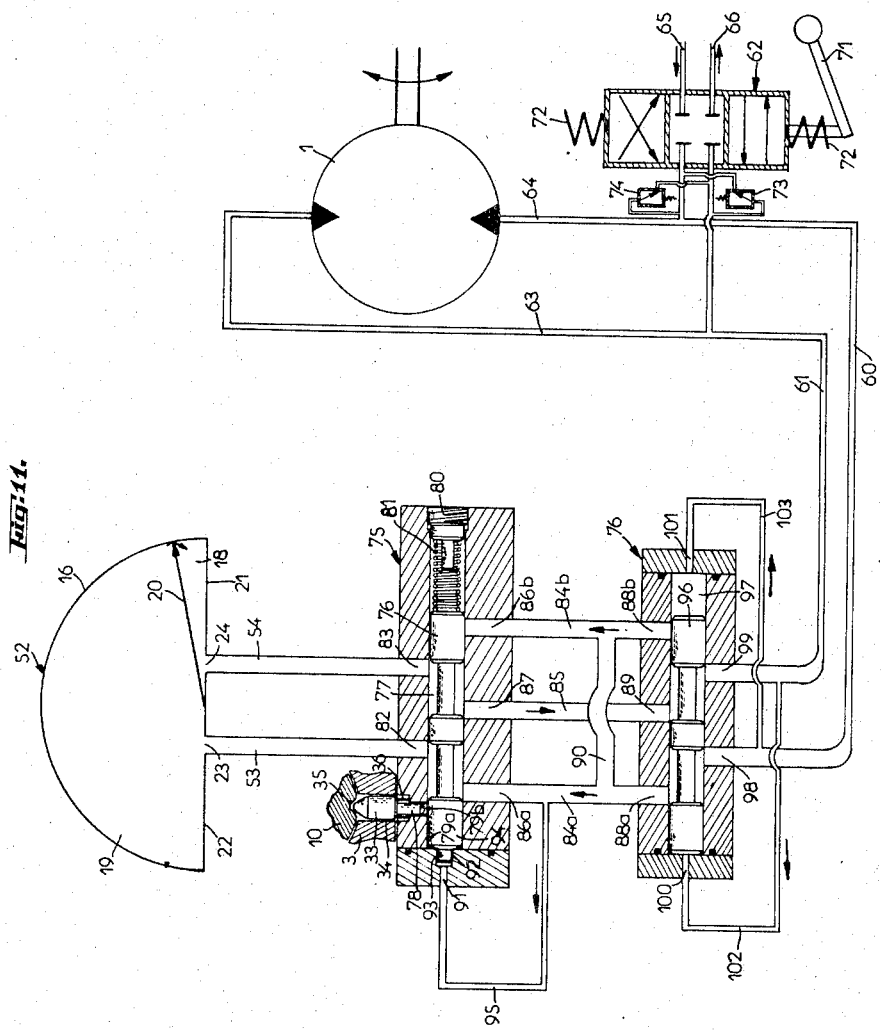

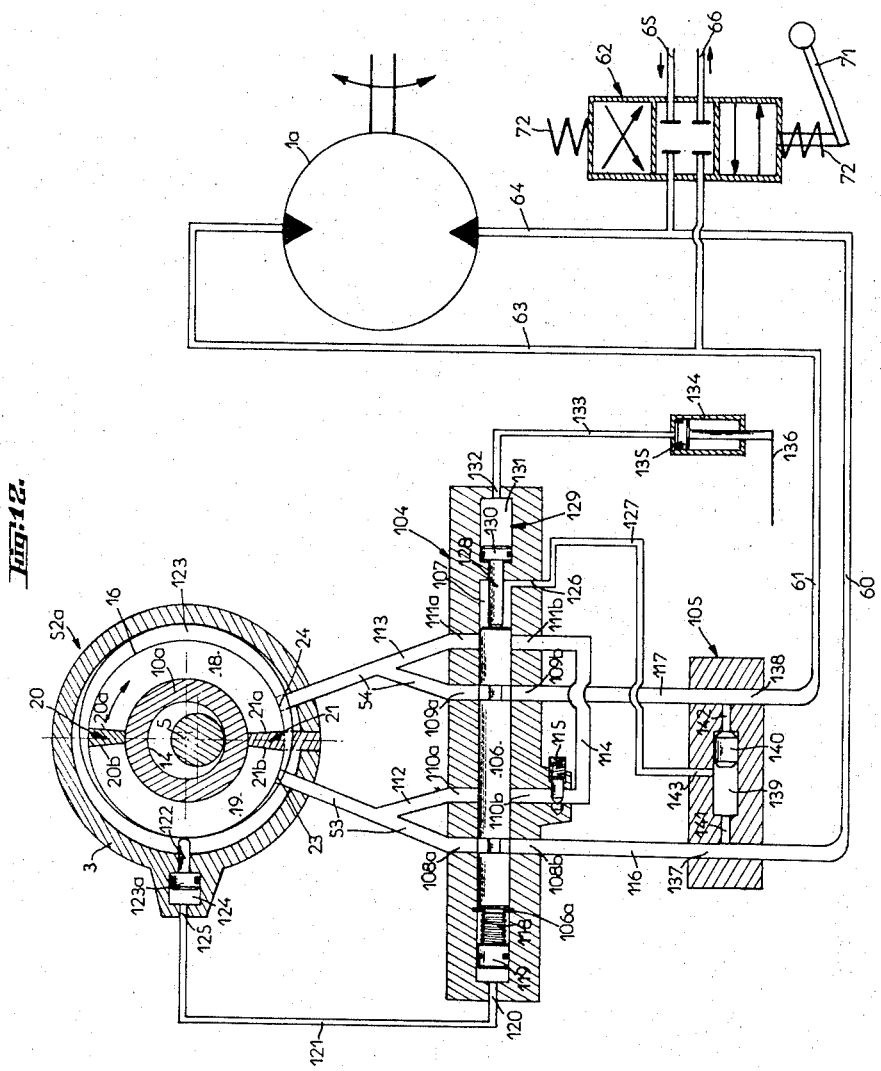

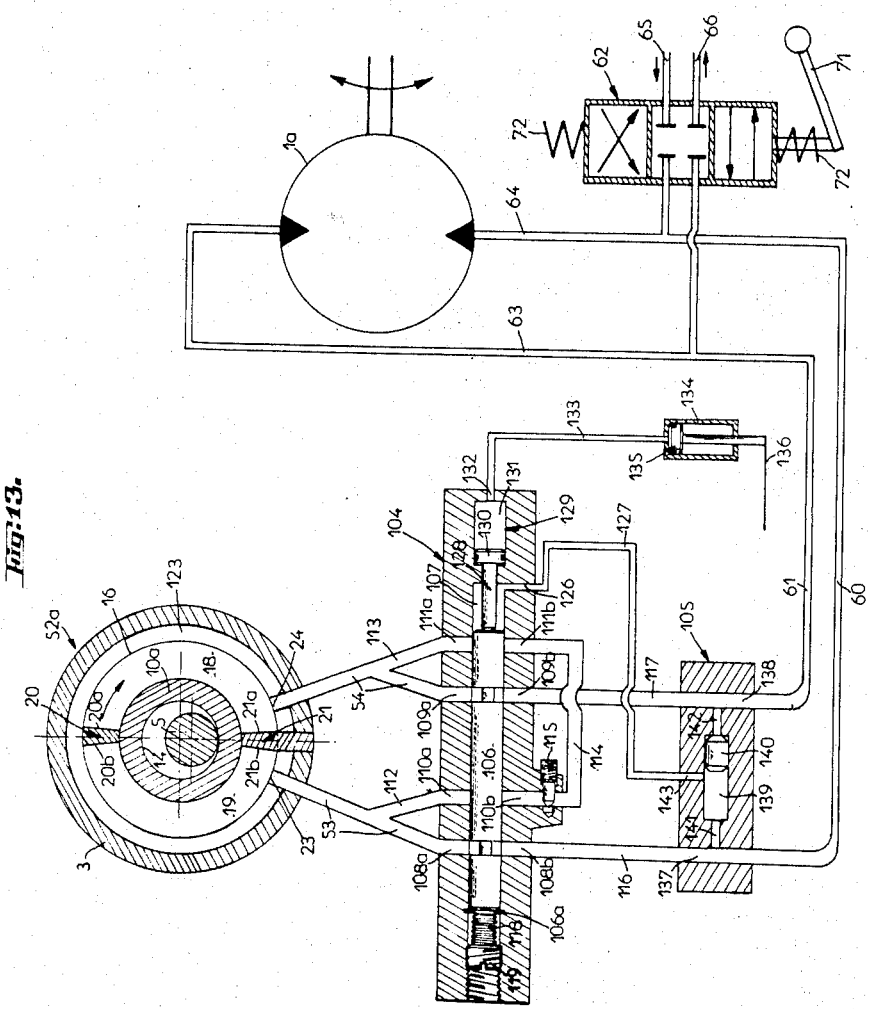

United States Patent Office 3,375,756
Patented Apr. 2, 1968

3,375,756
MULTIPLE- OR VARIABLE-SPEED MOTORS NOTABLY HYDRAULIC MOTORS WITH MONITORING SYSTEM AND ITS APPLICATIONS
Daniel Lucien Charles Maurice Bienaime, Lyon-Caluire, France, assignor to Hydraulica, Hollerich-Luxembourg, Luxembourg, a holding company of Luxembourg
Filed Dec. 22, 1965, Ser. No. 515,675
Claims priority, application Luxembourg, Feb. 6, 1965, 47,926
15 Claims. (Cl. 91—175)

ABSTRACT OF THE DISCLOSURE

Compressed-fluid device including a variable speed reversible motor and a monitoring or control system therefor whose speed varies continuously or stepwise, said motor being equipped with a movable distributor-plate coaxially rigid with the motor shaft and containing cylindrical bores substantially parallel to the shaft axis reciprocating pistons cooperating with a swash plate adjustably inclined to the axis of the motor shaft, the swash plate being rotatably movable on a support about an axis differing from the shaft axis and oblique in relation to the said swash plate so as to intersect said plate at a point substantially coplanar with the geometric locus of the points of contact of said pistons and swash plate, and the control system including means for rotating said support.

The present invention relates essentially to compressed-fluid receivers, notably of the hydraulic type, constituting a multiple- or variable-speed reversible motor, and also to the monitoring and control system thereof and its various applications in actual practice.

Positive-displacement or volumetric machines are already known of which a conventional type comprises as a rule a barrel-shaped rotor coaxial to the motor shaft and rigid therewith, this rotor comprising cylinders or cylindrical bores having their axes parallel to the rotor axis and disposed at spaced intervals on a circle concentric with said shaft. Mounted in these cylinders or cylindrical bores are reciprocating plunger pistons urged by spring means for example housed in said pistons so that the latter bear with their inner ends against a swash plate or thrust ring of the ball-race or ball-bearing type substantially concentric to the rotor but inclined at a fixed angle in relation to the rotor axis. As a rule the cylinders are fed with oil under pressure through a movable plate-type distributor coaxially rigid with the motor shaft, whereby the thrust exerted by said pistons on said inclined swash plate or ball-bearing race causes by reaction the rotation of said rotor and therefore of the motor shaft rigid therewith. Thus a rectilinear reciprocating motion is converted into a uniform continuous circular motion by means of a coupled volumetric rectilinear oscillating mechanism or control system, through the medium of an inclined swash plate or disk providing a coupling or a sliding or rolling contact connection. The velocity of rotation may be modified by altering the angle of inclination of the aforesaid swash plate or ball-race, thus varying the value of the positive piston displacement.

These known constant-output motors are attended by a number of inconveniences, inter alia the necessity of providing trunnions permitting of modifying the adjustable inclination of the thrust ring, thus making the structure more complicated at the expense of sturdiness; morover, controlling this inclination is scarcely convenient and generally difficult and delicate; besides, passive frictional resistances are considerable and the thrust or swash plate is not always moved in a strictly positive manner.

It is the object of this invention to avoid or reduce the above-listed drawbacks and the device according to this invention is remarkable notably in that the aforesaid swash plate is rotatably movable about an axis diverging from the axis of rotation of the aforesaid motor shaft, said swash plate axis being oblique in relation to the plate and intersecting same at a point lying substantially in the plane of the circular geometric locus of the points of contact of said pistons with said plate.

According to another feature characterizing this invention, control means actuated either manually (directly or through servo means) or automatically, possibly from a separate source of power, are connected to said swash plate for varying its angular position by rotating same.

According to a further feature of this invention, said control means consist of a servo-motor preferably of the compressed-fluid actuator type, notably hydraulically operated comprising a rotary piston of a type known per se which extends substantially coaxially to the aforesaid oblique axis of rotation and is coupled to said swash plate.

According to another feature of this invention said fluid-operated actuator is incorporated in the motor body and its rotor carries the aforesaid swash plate and is rotatably mounted in a fluid-tight manner in a substantially cylindrical bore of the corresponding stator-forming flange or end cover of said motor.

The value of the angular setting of said swash plate is subordinate to the desired maximum and minimum strokes, respectively, of the motor pistons. The swash-plate driving motor consisting in the present example given by way of illustration of a rotory hydraulic actuator may also consist of a cylinder actuated mechanically, pneumatically, electrically or otherwise. In this example, the power or energy necessary for operating this hydraulic actuator (which may be derived from a source other than the motor source of power) is the same as that energizing this motor, whereby the motor and the rotary actuator may be operated by being fed from a single and same pump or a single and same hydraulic compressor.

This invention is concerned more particularly with two main types of multiple-speed hydraulic motors, according as the motor speed varies continuously or stepwise. According to another feature characterizing this invention, in a motor of the discrete speed-variation type comprising at least two speeds, respectively a low speed and a high speed, the stator of said actuator comprises a fixed stop for the rotor of said cylinder which is so positioned as to limit at about 180° the permissible angular movement of said double-acting rotor between said fixed stop and the fixed piston-forming blade of the actuator, the arrangement being preferably such that the extremities of the diameter corresponding to the maximum inclination of said swash plate lie respectively in the axial plane containing the inlet and outlet ports of the actuator when said movable blade constituting the rotary piston of the actuator engages said fixed stop or said fixed blade.

The movement of said swash plate when it is rotated about its axis causes the motor pistons to recede into their bores, to compress their return springs and thus increase the pressure of the oil contained in the motor cylinders. This counter-pressure is then removed through conventional interconnecting, by-pass or exhaust valves acting as suction valves or the like, adapted to by-pass the motor and inserted in the hydraulic control circuit.

However, under certain circumstances the oil compressed by certain pistons of the motor barrel cannot escape through any one of the motor feed- or exhaust-ports. In this case, according to another feature of this invention, the head or feed flange of the motor comprises gauged overload valves adapted to connect the cylinders of said barrel with the inner space of the motor casing provided with a draining or exhaust orifice connected through a return or recovery pipe line or duct to the reservoir containing the hydraulic liquid. Thus, any excess oil in the cylinders is discharged into the motor casing or body and returned to the main reservoir.

In the case of a two-speed motor, the movable blade of the rotary actuator cannot rotate beyond half-a-revolution or 180° in one or the other direction, and has only two stable positions that is, the two extreme angular positions in which it engages either the fixed blade of the actuator or the fixed stop opposite thereto, so that the uppermost and lowermost points of said swash plate, i.e. the ends of its diameter in the position of maximum inclination, be always coincident with the corresponding suction and exhaust ports of the cylinder in order to preserve the motor timing. As a result, each change of speed of this two-speed motor involves the complete stoppage of the motor during the movement of the rotary-piston actuator of which the two endmost angular positions, respectively the low-speed and high-speed positions, correspond respectively to the minimum inclination angle and to the maximum inclination angle of the swash plate with respect to the motor axis.

Whereas, as explained hereinabove in the case of a two-speed motor, the movement of rotation of the inclined swash plate involves compulsorily the complete stoppage of the motor due to the change brought to its timing, the infinitely variable-speed motor is advantageous in that it is free of this subjection because the movement of the inclined swash plate is positively controlled by the motor feed flange. To this end, and according to another characteristic feature of this invention, the infinitely variable-speed motor comprises a timing plate rotatably mounted in the head flange coaxially to the motor shaft and connected by positive transmission means to said actuator rotor, said flange and said swash plate comprising ducts, channels and ports adapted to constitute feed and return paths for the motor cylinders independently of the angular position of said swash plate in relation to said flange. This connection must be of positive character for a small rotational difference between the inclined swash plate and the timing plate may interfere with, and even stop, the operation of the motor.

According to another feature of this invention said positive transmission means are of the gear type and comprise preferably a toothed wheel or annulus rigid with the actuator rotor and coaxial with the aforesaid oblique axis of rotation an auxiliary shaft mounted for free rotation in the motor casing and carrying two pinions meshing respectively with said toothed wheel of said rotor and with another toothed wheel or annulus rigid with said movable timing plate coaxially to said motor shaft. At the same time, by virtue of the ducts, channels or ports provided in said timing plate and said movable feed plate for feeding and discharging or exhausting said cylinders irrespective of the relative angular position of said timing plate and feed plate, the infinitely variable-speed motor receives a constant supply of fluid and therefore has constant timing characteristics, so that it can revolve without any inconvenience irrespective of the value of the angular position of said inclined swash plate and irrespective of its inherent angular setting within the limits of the permissible stroke of the piston of said rotary actuator. According to another feature of this invention, the angular amplitude of rotation of the rotary actuator of the infinitely variable-speed motor is preferably nearly a complete revolution or 360°, and the movable double-acting blade of said rotor is so disposed that in its endmost position corresponding to the maximum speed its axial plane is coincident with one end of the diameter corresponding to the maximum inclination of said inclined swash plate.

In both types of motors mentioned hereinabove the motor torque will constantly tend to return or urge the aforesaid inclined abutment or swash plate to its endmost high-speed or maximum-speed angular position, and the dimensions of the movable and fixed blades respectively of the actuator rotor must be so calculated as to overcome the motor torque. As a result, even if the stroke of the rotary cylinder approximates 360°, the movable blade of the actuator rotor will always stabilize itself in a position corresponding to the maximum angle of inclination of the aforesaid thrust or swash plate on the motor shaft, that is, to the high speed position. Therefore the actual position of the movable blade may be caused to correspond to the uppermost or lowermost point of the inclined swash or thrust plate so that the maximum-speed position will actually correspond to half the total value of the permissible angular rotation of the rotary actuator. To this end and according to another feature of the present invention the double-acting movable blade is so disposed that in the maximum speed position of said actuator rotor it is substantially diametrically opposite to the fixed blade of said actuator rotor. Thus, as a consequence of the oil pressure the movable blade and therefore the rotor solid therewith will be able to move in either directions from the high-speed to the low-speed position and furthermore it will always be automatically returned to its high-speed position by the motor torque.

This invention also relates to a monitoring and control circuit system for operating the device broadly set forth hereinabove, this system being of the type comprising a main distributor-reversing device having at least three positions including a neutral intermediate hydraulic-locking position and two end operative positions, one for each direction of rotation, this main distributor being interposed in the general feed and return circuit between the hydraulic pump or compressor and the atmospheric-pressure reservoir on the one hand, and the hydraulic motor on the other hand, possibly at least one non-return valve or the like, at least one overload or exhaust valve, and a pair of interconnecting valves branched off the feed and return lines respectively on the downstream side of said distributor. This arrangement is remarkable notably in that the aforesaid rotary actuator is connected to the downstream side of said main distributor, in parallel with the aforesaid motor by means of a speed-selector having at least two positions and constituting a distributor for controlling said rotary actuator which is operated either manually (directly or through servomotor means) or automatically by means of compressed fluid derived preferably from the main circuit and responsive to the operating pressure of said motor.

Thus, since the rotary-actuator control distributor is mounted in the motor feed circuit the rotary cylinder will be subjected to the same pressure variations as the motor itself, so that it is possible to use only the power output of a single pump for operating the entire circuit. As already set forth, this rotary-actuator control distributor may be either controlled through manual means comprising a direct lever or handle, or remote controlled by electrical, hydraulic, pneumatic, mechanical or equivalent transmission means, but this control will always require the personal intervention of the operator for each speed change. The aforesaid rotary actuator control distributor will preferably be of the two-position type, that is, with reversing positions, and can be opened in one or the other direction in order to preserve the constant pressurization of the rotary actuator irrespective of the speed selected for operating the motor. Since the rotary actuator is thus constantly fed with fluid under pressure, leakages may occur therein without altering the position of its movable blade, as far as this leakage is not likely to cause an abnormally high pressure drop in the general circuit. Thus, even a relatively considerable leakage output in the rotary actuator is not detrimental as far as the motor operation is concerned.

The speed selector constituting the rotary-actuator control distributor may be the same, that is, having two operative positions, in the case of a two-speed motor and in the case of the infinitely variable-speed motor, but in this case the infinitely variable-speed motor will operate exactly like the aforesaid two speed motor. However, by inserting in the rotary actuator circuit a three-position control distributor having two operative end positions with a neutral intermediate position therebetween for effecting the hydraulic locking or shutting-off, it is possible to operate the infinitely variable-speed motor at the velocity selected by the operator.

The monitoring system created by this invention may also be of the fully automatic type and adapted to meet the following requirements: in principle and by construction, the motor should always tend naturally to revolve at its maximum speed. In the case of a two-speed motor, low-speed operating conditions obtain automatically when its preset or predetermined maximum operating pressure is attained or overstepped, and the motor must be capable of operating at low speed from the thus defined maximum pressure to an arbitrarily predetermined minimum pressure value. If the motor was operating under low-speed conditions its service pressure will become lower than the aforesaid minimum pressure and the engine must automatically change to high speed. These speed changes must take place indifferently in either direction of rotation of the motor.

In the case of an infinitely variable-speed or variable-output motor, as the latter always tends to revolve at high speed its rate of operation should be reduced only if its operating pressure increases, that is, its velocity of rotation and its torque must be inversely proportional to each other without requiring any intervention of the operator, so that the power consumption remains constant. Moreover, the operator should have the possibility of counteracting (possibly by using romote control means) the automatic speed variation of the motor, that is, reducing the motor speed or restoring it to the minimum value even if its natural tendency is to revolve at a higher, or the highest, speed.

To this end and according to another feature characterizing this invention, the aforesaid speed selector of the automatic speed change operating as a function of the motor load is connected to the aforesaid main distributor by means of a two-position monitoring selector adapted to maintain the constant feed direction of said speed selector irrespective of the direction of rotation of the motor. The advantages deriving from this specific arrangement lie notably in the possibility on the one hand of preserving a simple hydraulic control circuit somewhat similar to the one corresponding to the aforesaid manual control, and on the other hand of automatically compensating leakages in the rotary actuator.

In fact, any leakage produced in the rotary actuator entails a movement of its movable blade and therefore of the rotor thereof otherwise constantly urged to its maximum-speed angular position; the position of this movable blade thus displaced may be corrected or altered by injecting at the proper moment an amount of oil equivalent to the leakage volume into the pressure compartment of the rotary actuator. This injection may be controlled directly or indirectly by the operator acting upon the aforesaid three-position control distributor controlling the rotary actuator; it may also be controlled by causing the operation of the rotary-actuator feed distributor to be responsive to the position of the rotary actuator proper, this distributor being if desired independent of the main feed distributor of the rotary actuator.

According to another feature of this invention the aforesaid speed selector comprises a cylindrical balanced slide valve having three substantially coaxial piston-valves slidably mounted in a body having at least two ports, passageways or ducts respectively for the feed and return circuits, at least one spring or the like for urging the slide valve to its end position corresponding to maximum-speed operation, and, preferably, separate or servo-action means for adjusting the force of said return spring and/or a stop for limiting the stroke of said slide valve.

According to another feature of this invention, the aforesaid speed selector comprises a control input port communicating through a duct branched off the upstream feed duct for the compressed fluid which opens into the longitudinal end of the cavity receiving said slide valve, corresponding for example to the minimum speed position. By virtue of this arrangement, the aforesaid oil injection may also be performed by so governing the operation of the speed selector of the rotary actuator that the force or calibration of the return spring urging its slide valve to the closed position of said slide valve receiving on its opposite end face the pressure of the fluid circulating in the circuit is modified by the slightest movement of the rotary actuator, whether this movement is caused by a leakage in said actuator or otherwise. To this end, and according to another feature of this invention, the speed selector of the aforesaid infinitely variable-speed motor comprises means for automatically varying the calibration or force of the return spring associated with said slide valve, said means being responsive to the momentary relative position of the aforesaid actuator rotor and consisting preferably of a feeler in the form of a movable follower or like member constantly engaging a cam or like element rigid with said actuator rotor and connected through hydraulic, mechanical, electrical or similar transmission means to a movable stop of said return spring the contour and relative angular setting of said cam or like element with respect to said actuator rotor being such that said follower is moved home by said cam in the minimum-speed position of said rotor. In practice, the impulse modifying the calibration of said spring will be conveniently transmitted to the movable abutment of this spring either by direct mechanical connection or by hydraulic connection.

In a monitoring system thus constructed, that is, of the automatic speed change type, the possibility of manually feeding the rotary actutaor is preserved and to this end, according to a complementary feature of this invention, the aforesaid speed selector of said variable speed motor comprises means for manually controlling its slide valve and moving the latter to its minimum-speed position, these means consisting preferably of a movable push member adapted to move said slide valve to actuate same either through direct mechanical means or through a single-acting hydraulic actuator. It is thus possible to counteract at will the normal tendency of the motor to revolve at maximum speed.

The present invention is also concerned with the various practical applications of the aforesaid device and monitoring circuit means, notably for propelling automotive vehicles and more particularly public-works or earth-moving machines, mining machines, transport machines, hoisting machines, material handling machines and equipment, machine-tool or the like, as well as the apparatus, machines, vehicles and plants equipped therewith.

Other features and advantages of the present invention will appear as the following description proceeds with reference to the following detailed description.

In the attached drawing typical forms of embodiment of the invention are illustrated diagrammatically by way of example. In the drawings:

FIGURE 2 illustrates in separate axial section the rotary actuator controlling the inclined thrust plate, the section being taken upon the broken line II—II of FIGURE 3;

FIGURE 3 is a cross-sectional view of the rotary actuator taken upon the line III—III of FIGURE 2;

FIGURE 4 shows in separate perspective view the rotor of the aforesaid rotary actuator;

FIGURE 5 is a separate perspective view showing the movable blade of the aforesaid rotary actuator assumed to be removed therefrom;

FIGURE 6 is an exploded perspective view of the fixed blade of the aforesaid rotary actuator and of its adjustable pressure stop member;

FIGURE 7 is a longitudinal section showing the infinitely variable-speed motor of this invention;

FIGURE 8 is a diagram showing the hydraulic control circuit of the two-speed motor with manual monitoring of the aforesaid rotary actuator;

FIGURE 10 illustrates a modified form of embodiment of the manual monitoring system of FIGURE 9, whereby a continuous variation of the motor speed may be effected;

FIGURE 11 illustrates the diagram of the hydraulic control circuit of the two-speed motor with means for monitoring the aforesaid rotary actuator according to the automatic change-speed characteristic;

FIGURE 12 illustrates the diagram of the hydraulic circuit controlling the infinitely variable-speed motor with means for monitoring the aforesaid rotary actuator according to the aforesaid automatic change-speed characteristic;

FIGURE 13 illustrates a modified form of embodiment of the hydraulic control circuit of FIGURE 12.

Figure 1:
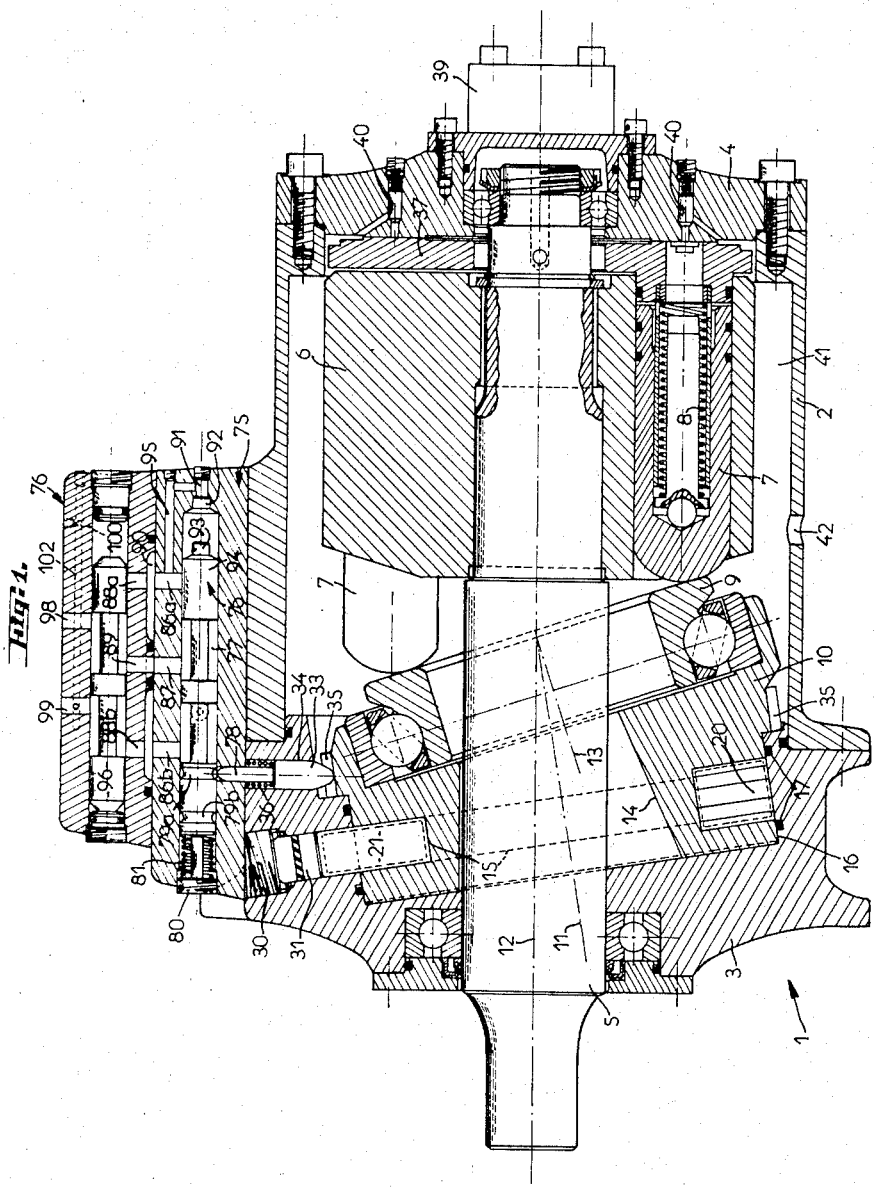
FIGURE 1 illustrates in longitudinal section a two-speed hydraulic motor according to this invention.

Referring first to the exemplary form of embodiment shown in FIGURE 1, the reference numeral 1 designates generally a two-speed hydraulic motor according to this invention, which comprises in a manner already known per se a casing 2 constituting a lateral wall closed at its opposite ends by end flanges 3 and 4. Mounted in the end bearings of the motor is the rotary motor shaft 5 supporting the barrel or cylinder-block 6 containing the axial pistons 7 constantly urged by their return springs 8 against an inclined swash plate or thrust ring 9 consisting of a thrust ball-bearing mounted in a fixed inclined position in relation to the axis of shaft 5 within a support 10 carried by the end flange 3. Alternately, the inclined swash plate 9 may consist of a simple fixed plate or disk slidably engaged by the outer ends of pistons 7.

Members 3 and 10 constitute respectively the stator and rotor of a rotary hydraulic actuator or cylinder having an axis of rotation 11 and adapted to cause the swash plate or thrust ring 9 to revolve about said axis 11 which differs both from the axis 12 of the motor shaft and from the axis of revolution 13 of the thrust ring or swash plate 9. This rotation through a given angle of plate 9 varies or alters its angle of inclination in relation to the axis 12 of the motor shaft and, therefore the velocity of rotation of this shaft.

The aforesaid hydraulic rotary actuator is shown more in detail in FIGURES 2 and 3. The swash plate 9 and rotor 10 have a central passage formed therein through which the motor shaft 5 extends freely. The rotor 10 has formed in its outer peripheral wall a circumferential groove 15 substantially coaxial with the axis 11 and forming with the inner lateral wall 16 of the cylindrical bore of stator 3 in which said rotor is rotatably mounted an annular space constituting a working chamber for the fluid or hydraulic liquid under pressure. This annular space 15 is sealed by at least one pair of packing on O-rings 17 disposed on either side of said annular space and providing a fluid-tight sliding contact between the rotor 10 and the lateral wall 16 of stator 3. The working chamber 15 is divided in a fluid-tight manner into two compartments 18 and 19 of which the volumes are simultaneously variable respectively in opposite directions, on the one hand by a movable radial blade, vane or the like 20 rigid with the rotor and in fluid-tight sliding contact with the inner lateral wall 16 of the stator, and on the other hand by a fixed radial blade, vane or the like 21 rigid with the stator 3 and in fluid-tight sliding contact with the rotor 10.

A fixed stop member 22 rigid with the stator 3 and projecting into the annular space 15 limits the permissible angular stroke of the movable blade 20. Under these conditions the rotor 10 with its movable blade 20 constitutes a rotary piston of which the maximum angular movement is preset by the relative positions of the fixed stop member 22 and fixed blade 21. The fixed stop member 22 is advantageously so positioned that the permissible or maximum angular stroke in one or the other direction of said rotor 10 is about 180° by the engagement of the movable blade 20 with either the fixed stop member 22 or the fixed blade 21. In FIGURES 2 and 3, the relative angular position of the rotor 10 and therefore of the movable blade 20, as determined by the respective positions of the fixed blade 21 and fixed stop member 22, corresponds substantially to the acute angle of maximum inclination of the swash plate 9 in relation to the motor shaft 5; in other words, the movable blade 20 lies substantially in the plane of the diameter corresponding to the maximum inclination of swash plate 9 with respect to the axis 12. On the other hand, when this blade 20 abuts against the fixed blade 21 the acute angle of inclination of said swash plate 9 with respect to the motor shaft 5 is minimum and corresponds therefore to the high speed of the motor.

The wall of stator 3 has formed therethrough at least two orifices 23 and 24 constituting respectively and mutually or alternatively the fluid inlet and outlet ports, these orifices opening directly respectively into the compartments 19 and 18 whereby the hydraulic cylinder constituted by the stator 3 and rotor 10 is a double-acting cylinder (see FIGURE 3).

The three-dimensional configuration of the rotor 10 of this actuator is clearly apparent from the perspective view of FIGURE 4, and FIGURE 5 shows the specific configuration of the movable blade 20, FIGURE 6 showing on the other hand the configuration of the fixed blade 21. The aforesaid orifices 23 and 24 are located preferably in close proximity and on either side of the fixed blade 21. The movable blade 20 is advantageously detachable and fitted in the aforesaid peripheral groove 15 of the rotor, and retained therein by any suitable fastening means such as screws, bolts, circlips or the like. The fluid-tightness between the contour of the movable blade 20 which lies in the radial plane containing the axis 12 and the surrounding groove 15 and lateral wall 16 is obtained by means of a packing strip or the like 25 inserted or fitted in a suitable peripheral groove formed in this blade. This movable blade also comprises laterally, on either side, a projecting rib 26 actually engaging the fixed stop member 22 or the fixed blade 21, and adapted to provide respectively between this fixed stop member or this fixed blade and the movable blade 20 a clearance constituting a free or so-called "detrimental" space permitting the ingress of compressed fluid for actuating the blade.

The fixed blade 21 is mounted in a corresponding recess 27 of stator 3 and its end projecting into the annular space 15 is slidably fitted in and in fluid-tight engagement with, the peripheral groove 15 of the rotor, a continuous sliding contact being obtained throughout the length of the transverse contour of this groove 15. The fluid-tightness of the contact joint between the fixed blade 21 and the inner wall of groove 15 is obtained by using a longitudinal annular packing or strip 29 surrounding completely the blade 21 and preferably fitted or mounted in a corresponding groove of said fixed blade. Adjustable pressure means are provided for urging the fixed blade 21 against the rotor 10 of the rotary actuator and consist preferably of a clamping or pressure screw engaging a tapped hole formed in the stator 3 substantially at the end of the fixed blade 21 and acting upon this blade by means of an intermediate sealing member 31 fitting in fluid-tight sliding contact, like the fixed blade 21 proper, in the stator cavity 27 and provided with a transverse annular sealing strip or packing 32 surrounding said part and fitted preferably in a corresponding groove thereof to seal the sliding-contact joint with the wall of said stator cavity 27.

Advantageously, at least one elastic locking or detent-positioning means is provided for holding the rotor 10 in each one of its endmost angular positions, this means consisting preferably of a spring-loaded bolt or the like comprising a stud or like member 33 sliding in a substantially radial direction within a bore 34 of stator 3 and adapted to engage in succession two diametrally opposite notches, recesses or impressions 35 formed in the rotor 10. A spring 36 constantly urges the member 33 against the outer surface of rotor 10. The operative end of member 33 has preferably a rounded tip and the edges of notches 35 are also rounded so that the rotor 10 may be released automatically as a consequence of the pressure exerted by the compressed fluid on the movable blade 20. Besides, the annular space 15 and blades 20, 21 are so dimensioned that the rotary actuator can overcome the reaction torque of the hydraulic motor.

The barrel 6 of the hydraulic motor is equipped with a conventional distributor disk 37 rotatably solid with said barrel and provided with distributing ducts and ports corresponding to conjugate ducts and ports formed in the head-forming flange 4.

This flange 4 is connected to the hydraulic control circuit by means of a connecting unit 39 comprising the necessary connecting unions. As already explained hereinabove, this flange 4 comprises square-sectioned adjustable overload valves 40 adapted to connect the cylinders of barrel 6 with the inner space 41 of the motor casing formed to this end with an exhaust or vent orifice 42 connected through a return or recovery pipeline (not shown) to the hydraulic fluid reservoir.

FIGURE 7 illustrates the infinitely variable-speed hydraulic motor comprising substantially the same component elements or sections as the above-described two-speed motor. However, in order to avoid the compulsory stoppage of the motor during the operation of the hydraulic actuator adapted to modify the inclination of the swash plate 9, this construction comprises a movable distributor disk 43 rotatably mounted in the stationary end plate or flange 4a coaxially with the motor shaft 5, and comprising the ducts and ports necessary for communicating with the distributor plate 37 rotating bodily with barrel 6. Thus, this distributor plate 43 may comprise for example two curved slots disposed substantially symmetrically to the plate center, as shown at 44, these slots communicating through ducts 45 respectively with the oil feed and return pipe lines such as 45a of the fixed flange 4a.

In order to preserve the relative arrangement of the distributor members 37 and 43 the rotor 10a of the actuator is positively connected for example through mechanical transmission means to the distributor plate 43 whereby any rotation of this rotor 10a will cause synchronously a concomitant rotation, for example of same magnitude, of distributor plate 43. In the form of embodiment illustrated in FIGURE 7 the mechanical transmission means provided for performing this positive drive is of the gear type and comprises preferably a toothed wheel or annulus 46 coaxially solid with the rotor 10a and in meshing engagement with a driving pinion 47 carried by a lay shaft 48 rotatably mounted in adequate bearings 49 of casing 2a of this motor, and comprising a driven pinion 50 meshing with a toothed wheeel or annulus 51 coaxially rigid with the rotary distributor plate 43.

In this infinitely variable-speed motor 1a the hydraulic actuator comprises only one fixed stop member 21 so that the maximum amplitude of the movement of rotation performed by the rotor 10a is substantially of the order of 360°. The double-acting movable blade 20 is preferably so disposed in relation to the swash plate 9 that in the maximum speed position of this plate 9 (corresponding to the acute angle of minimum inclination of said swash plate in relation to the shaft axis 12) the blade 20 is substantially diametrally opposite to the fixed blade 21, so that both blades lie substantially in the plane of the diameter corresponding to the maximum inclination of the inclined plate 9 in relation to the axis 12 of motor shaft 5.

FIGURE 8 illustrates the diagram of the hydraulic two-speed motor control circuit wherein the passage from one speed to the other is controlled by manual means. In this example the two-speed motor is also designated by the reference numeral 1 and the actuator controlling its inclined swash plate is shown at 52. The two ports or unions 23, 24 of actuator 52 which are used by turns, mutually or alternatively (according to the direction of rotation of the actuator) for exhausting or forcing fluid from the other compartment, are connected through a pair of inlet and outlet ducts 53, 54 respectively to a speed selector 55 constituting a separate reversing distributor having two operative positions, that is, positions for feeding the fluid in two opposite directions and thus control the actuator 52 in either direction of rotation. This speed selector 55 is controlled either manually by mechanical direct means or from a distance by means of hydraulic servo-control means 56, 57 of the hydraulic cylinder-and-piston type, actuated by the operator and connected through a pipe line 58 to the speed selector 55 for controlling the slide valve thereof, this slide valve being advantageously provided with a return spring 59. The speed selector 55 is connected by means of two pipe-lines 60, 61 to the main reversing distributor 62 controlling the motor 1, which is branched off the lines 60 and 61 in parallel with the actuator 52 by means of branch lines 63, 64. This main distributor 62 having at least three positions i.e., two operative end positions for controlling the motor in either direction of operation and an intermediate neutral position, is connected through a feed line 65 and a return line 66 to a pump or a hydraulic compressor 67, a non-return valve 68 and a safety overload valve 69 being interposed in this circuit section; the pump 67 draws oil or other hydraulic liquid from a reservoir 70 for example at the atmospheric pressure, which is also connected to the return line 66. The main distributor 62 is shown in this example as comprising a direct mechanical hand lever 71 for controlling its distributor slide valve equipped for example with a pair of antagonistic return springs such as 72.

Between the pipe-lines 60 and 61 and upstream of the connection leading to the motor 1 are branched off a pair of interconnecting valves acting as relief valves, or suction valves, of square-sectioned by-pass valves 73, 74 adapted to be opened by the counter-pressure of the oil forced by the motor pistons actuated by the inclined swash plate during a speed change, and to return to the suction side of said motor a volume of oil equal to the volume forced by said pistons.

Figure 9:
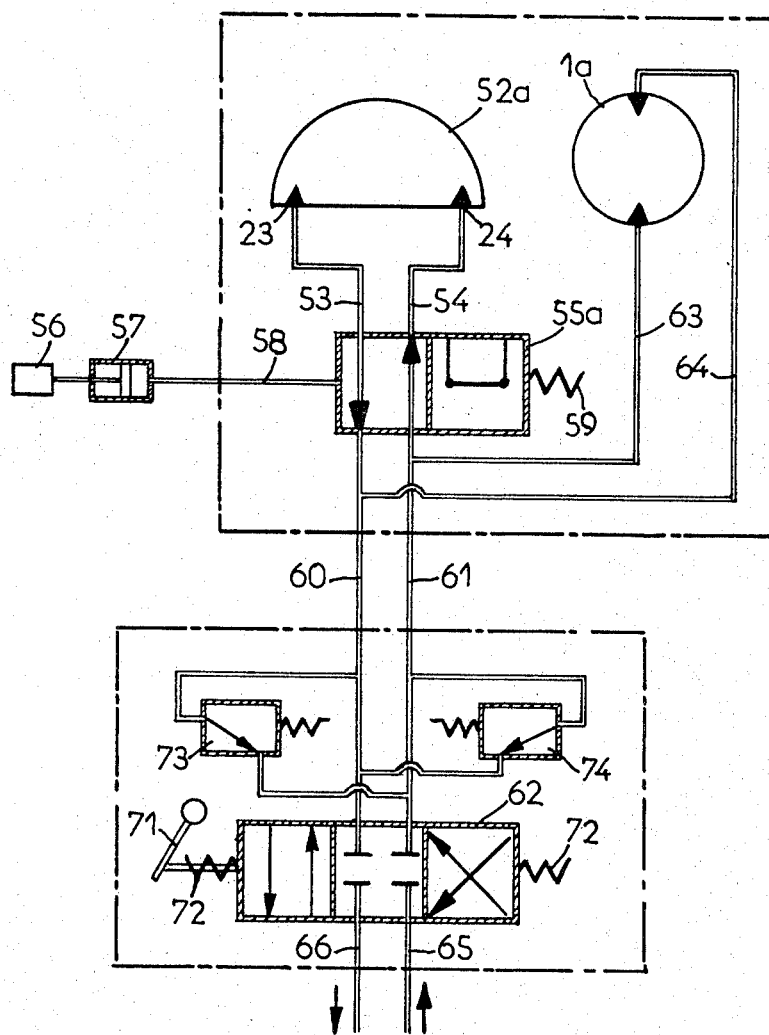
FIGURE 9 is a diagram showing the hydraulic control circuit of the infinitely variable-speed motor with a rotary actuator so monitored that this motor operates like the aforesaid two speed-motor.

FIGURE 9 illustrates the diagram of the hydraulic circuit controlling the infinitely variable-speed motor wherein the speed change is obtained by manually monitoring the actuator 52a by means of a speed selector 55a having two operative motion-reversing positions. This diagram differs from the preceding one only by the specific internal configuration of the selector corresponding to one of these two operative positions. Since the selector 55a comprises only two operative motion-reversing positions, the motor 1a, although designed for continuous speed variation, will operate with this device as a two-speed motor.

FIGURE 10 illustrates a modified form of embodiment of the diagram of FIGURE 9 wherein the two-position speed selector 55a is replaced by a three-position selector 55b comprising two extreme motion-reversing positions with a neutral or hydraulic-locking intermediate position, thus providing a continuous speed variation of motor 1a, that is, any desired intermediate velocity of rotation between a minimum speed and a maximum speed.

FIGURE 11 illustrates the diagram of the hydraulic control circuit designed for the two-speed motor 1 with automatic speed change control. The diagram of FIGURE 11 differs from the one of FIGURE 8 only in that the manual control speed selector 55 is replaced with a speed selector 75 having two operative motion-reversing positions with automatic hydraulic control, and by a monitoring selector 76 having two operative positions which is inserted in series between the main distributor 62 and the speed selector 75.

The body of the speed selector 75 comprises a recess 77 in the form of a cylindrical bore in which a three-piston cylindrical slide valve 76 is slidably mounted and adapted to move alternatively in either direction to the endmost positions in which it engages the bottoms or longitudinal ends of bore 77.

The speed selector 75 comprises a member adapted to lock the slide valve 76 in each one of its end positions and preferably means for controlling said locking member which are responsive to the momentary position of the rotor 10 of actuator 52. Advantageously, the detent-positioning means 33, 36 of the actuator rotor 10 are mutually interconnected with the slide-valve backing means 76 so that the locked position of these means corresponds to the release position of said detent-positioning means, and vice-versa. To this end, the sliding member 33 of the detent-positioning means has a shank-or rod-like extension 78 adapted to engage in succession with its free end two spaced retaining notches 79a, 79b of said slide valve, which are for example in the form of recesses, cavities, grooves or the like, formed in one of the end pistons of slide valve 76 and correspond respectively to each one of the two endmost opposite positions of this slide valve. The above-described return spring 36 of said detent-positioning means constantly urge the extension 78 out from the notch of slide valve 76, that is to its release, free or unlocking position.

One of the longitudinal end faces of the cylindrical bore 77 which constitute stop means limiting the stroke of slide valve 76 consists of an adjustable stop 80 in the form for example of a screw plug of which the axial position may be modified by screwing or unscrewing same. A return spring or the like 81 is housed in the bore 77 between this adjustable stop member 80 and the corresponding adjacent end face of the slide valve 76 so as to constantly urge this slide valve to its opposite endmost position (i.e. on the left-hand side of FIGURE 11).

The compartments 18 and 19 of actuator 52 are connected respectively to the speed selector 75 through the medium of ducts 53, 54 leading respectively to the ports 82, 83 of the selector body which open into the cylindrical bore 77. The speed selector 75 is also connected to the monitoring selector 76 by means of three ducts 84a, 84b, 85 connecting respectively three orifices 86a, 86b, 87 of speed selector 75 (which open into the bore 77 thereof) with three corresponding ports 88a, 88b, and 89 of the monitoring selector 76. Ducts 84a and 84b are always used for directing compressed fluid constantly flowing in the same direction from the monitoring selector 76 for feeding the speed selector 75, and the third duct 85 is always used to transfer return fluid flowing in a constant direction from the speed selector 75 to the monitoring selector 76. Both ducts 84a and 84b are interconnected by a transverse passage 90 providing a constant communication therebetween.

To simplify the disclosure, the actuator 52 has been shown only very diagrammatically in FIGURE 11 in the form of a half-circular sector 16 to illustrate the maximum or 180-degree angular movement of the movable blade shown in the form of a movable radius 20 of said half-circle, the diametrally opposite end radii 21 and 22 corresponding respectively to the fixed blade and the fixed stop member of the actuator. It will be assumed that the position of the movable blade 20 in which the latter engages the fixed blade 21 corresponds to the high motor speed and that the diametrally opposite position of movable blade 20 in which the latter engages the fixed stop member 22 corresponds to the low motor speed. The longitudinal relative spacing of notches 79a, 79b corresponds substantially to the total useful stroke of slide valve 76, and the respective lengths of the three pistons of said slide valve and their relative spacings are such that in the left-hand extreme position of the slide valve, as seen in FIGURE 11, port 82 communicates with port 86a through the cylindrical bore 77, and port 83 communicates with port 87 through the same bore 77, while port 86b is closed by the corresponding piston. Similarly, in the right-hand extreme position of slide valve 76 port 86a is closed by the corresponding piston, port 82 communicates with port 87, and port 83 communicates with port 86b. Thus, the return spring 81 of slide valve 76 constantly tends to urge same to its left-hand end position wherein the compressed fluid flows through duct 53 to feed compartment 19 of the actuator so as to move and hold the movable blade 20 thereof in the high-speed position. At the end of speed selector 75 which is opposite to the end receiving the return spring 81 an orifice 91 opening into the cylindrical bore 77 by means of a widened cylindrical portion 2 is provided, a cylindrical projection or stud 93 of corresponding diameter of the adjacent end piston of slide valve 76 being adapted to engage with a sliding fit said widened portion 92, this portion 92 being preferably longer than said stud or projection 93 so that the end piston 94 will abut with its end face of same diameter as bore 77 against the corresponding bottom face of the selector body. The orifice 91 is constantly connected to branch pipe line 95 leading from pipe line 84a.

The monitoring selector 76 comprises a balanced cylindrical slide valve 96 having three substantially coaxial piston like valve members slidably mounted in the cylindrical bore 97 of a body through which at least two passageways or ducts are formed. The aforesaid ports 88a, 88b and 89 open into this cylindrical bore 97 and the body of the monitoring selector 76 comprises two other ports 98 and 99 connected to the main distributor 62 by means of said pipe-lines or ducts 60 and 61. The slide valve 96 is also provided with two end positions in which it engages respectively the two opposite bottoms or ends of the body 76 which are formed respectively with orifices 100 and 101 opening into said bore 97 in front of the outer faces of the corresponding end pistons of slide valve 96. Orifice 10 is constantly connected through a branch line 102 to the aforesaid pipe-line 61, and orifice 101 is also constantly connected through a branch line 103 to the pipe-line 60.

The relative disposal of ports 88a, 88b, 89, 98 and 99 the relative lengths and spacings of the three pistons of slide valve 96 are such that in the extreme left-hand position of slide valve 96 as shown in FIGURE 11, port 88b is closed by the corresponding piston and port 88a communicates through bore 97 with port 98, and port 89 communicates through said bore 97 with port 99.

In FIGURE 1 the speed or output selector 75 and the monitoring selector 76 are shown as being directly mounted or juxtaposed on the motor casing in order to provide a more compact assembly and avoid any intermediate pipe lines. In FIGURE 1, the retaining notches 79a and 79b are shown as consisting of circular grooves formed in the corresponding end pistons of the slide valve.

The function of the monitoring selector 76 consists in constantly maintaining the same direction of feed or flow of the high-pressure feed fluid and of the low-pressure discharge or return fluid, as far as the speed selector 75 is concerned, irrespective of the direction of rotation of motor 1. The function of the speed selector 75 is on the one hand to permit the supply of fluid under pressure to the rotary actuator 52 in the direction corresponding to high-speed or low-speed operation, and on the other hand to make up the leakage output of the rotary actuator (notably between the movable blade 20 of the rotor and the inner lateral wall 16 of the stator), by constantly feeding fluid thereto at the operating pressure of the motor. Finally, the main distributor 62 will advantageously comprise at least two overload or safety valves calibrated at a pressure slightly higher than the normal operating pressure of motor 1 and adapted to absorb pressure surges or overloads resulting from the thrust exerted by the inclined swash plate on the motor pistons when changing the motor speed.

This control system operates as follows: To facilitate the understanding and by way of illustration only it will be assumed that when a predetermined maximum operating pressure set arbitrarily at, say, 120 kg./cm.$^2$ is attained by the motor 1 the latter, having the inherent and normal tendency of constantly revolving at maximum speed, must automatically switch to low speed. The motor must operate at low speed from this maximum pressure (120 kg./cm.$^2$) to the minimum pressure, set arbitrarily at, say 50 kg./cm.$^2$ and when its operating pressure drops below this value the motor must automatically change to high speed, and vice versa. Considering the relative positions of the rotor 20 of actuator 52 and the slide valves 76 and 96 of speed selector 75 and monitoring selector 76, as shown in FIGURE 11, it will be assumed that the distributor 62 is in its operative position such that pipe-lines 60 and 64 operate as feed lines for the oil under pressure, while pipe-lines 61 and 63 act as low-pressure oil return lines. Under these conditions, the rotor 20 of actuator 52 being in its high-speed position and the motor 1 revolving in a given direction under a pressure exceeding 50 kg./cm.$^2$, the oil under pressure fed through pipe line 60 will flow through duct 103 and orifice 101 at the end of the monitoring selector 76 and push and hold the slide valve 96 in its right-hand extreme position, whereby the oil under pressure can flow through the monitoring selector 76 (port 98, bore 97 and port 88a), duct 84a and pipe-line 95 into the orifice 91 at the end of speed selector 75. The force of the return spring 81 in the speed selector, which may be adjusted by altering the position of the adjustable stop 80, is set to correspond to an oil pressure of about 120 kg./cm.$^2$ whereby if the momentary oil pressure is below the maximum pressure contemplated (120 kg./cm.$^2$) this spring 81 will move the slide valve 76 to its left-hand end position so that the oil under pressure can flow from the speed selector 75 through port 86a, bore 77 and port 82 into the compartment 19 of the rotary actuator through pipe-line 53 and port 23 of said actuator, thus acting upon the movable blade 20 to keep same in its high-speed position, that is, in engagement with the fixed stop member 21. The oil leakages occurring in this actuator, as shown diagrammatically by the arrow passing over the outer tip of the movable blade 20, are thus discharged into the return circuit through the other port 24 of actuator 52, pipe-line 54, port 83, bore 77 and port 87 of the speed selector, duct 85, port 89, port 97 and port 99 of the monitoring selector, and finally pipe line 61 leading to the reservoir by means of the main distributor 62. The rotor 10 of actuator 52 is then held against motion, in the high-speed position, by the end 33 of the detent-positioning lock-bolt 33 engaging the notch 35 of said rotor, and the opposite end 78 of said bolt is retracted from the groove 79b of slide valve 76 of speed selector 75.

With the motor 1 revolving under the above-described conditions it will now be assumed that its operating pressure increases, for example as a consequence of an increasing load, up to the maximum value arbitrarily set at 120 kg./cm.$^2$ hereinabove. This pressure will then act through orifice 91 on the small face formed at the free end of the shoulder or narrower extension 93 of slide valve 76, in the speed selector, by overcoming the antagonistic force of the calibrated spring 81, whereby slide valve 76 will gradually move to the right while compressing this spring 81 until the cavity 92 is completely free. Then this 120 kg./cm.$^2$ pressure will be applied to the entire cross-sectional area of slide valve 76, whereby the latter is moved to the position corresponding to the low speed, and its opposite end face will engage the adjustable stop 80. At this moment the supply of compressed fluid to the rotary actuator 52 will be reversed.

Port 86a will be closed and the oil under pressure from duct 84a will flow through the interconnecting pipe 90, duct 84b, port 86b of speed selector 75, bore 77, port 83 of speed selector 75, pipe-line 54, port 24 to compartment 18, its pressure then causing the movable blade 20 to move to the left, that is towards the low-speed position.

As a result, the detent-positioning means 33, 78 responsive to the movement of the actuator rotor 10 is expelled from the groove 35 thereof and compresses the spring 36 while engaging with its end 78 the groove 79a of slide valve 76, thus locking this valve 76 in its right-hand low-speed position throughout the time required for operating the rotary actuator 52. On the other hand, the pressure in the main circuit remains at its maximum value (120 kg./cm.$^2$) since any movement of the rotary actuator is normally attended by the opening of the overload, interconnecting or by-pass valves 73, 74 of main distributor 62. Moreover, the motor 1 is stopped during the change-speed operation, that is, during the operating time of actuator 52. On the other hand, the exhaust valves 40 (see FIGURE 1) also calibrated at 120 kg./cm.$^2$ will discharge the oil compressed by the motor pistons 7 moved as a consequence of the operation of the rotary actuator, this oil returning to the oil reservoir through a cavity 41 of the motor casing, the discharge orifice 42 thereof and a return line (not shown).

The movable blade 20 will thus engage the fixed stop member 22 and the motor is thus switched to low-speed conditions. The detent-positioning device 33, 78 urged by its return spring 36 engages with its end 33 the groove 35b of rotor 10, which is diametrally opposite the groove 35, and its other end 78 is simultaneously disengaged from groove 79a of slide valve 76 to free the latter. The slide valve 76 of selector 75 is thus held in its low-speed position (at the right-hand end of bore 77 as seen in FIGURE 11) only by the pressure exerted on its faces at the end of the shouldered extension 93 and of piston 94 at the opposite end, and it is admitted that this pressure cannot be lower than 50 kg./cm.$^2$. Thus, the motor 1 revolves at low-speed and its operating pressure may vary from 50 to 120 kg./cm.$^2$.

Under these conditions, assuming now that the operating pressure decreases, for example as a consequence of a load reduction to a value, say, below 50 kg./cm.$^2$, the slide valve 76 of speed selector 75 is moved by its return spring 81 to its extreme left-hand or high-speed position and the shouldered stud 93 at the outer end of the endmost piston 94 engages the cavity 92 to close the orifice 91 and therefore the groove 79b of slide valve 76 underlies the end 78 of the detent-positioning bolt 33, 78. Thus, the supply of compressed fluid to actuator 52 is again reversed as the initially contemplated conditions and relative positions are restored. The movable blade 20 will then start its movement toward the high-speed position and this movement of the rotary actuator 52 is attended immediately by the ejection of the bolt end 33 from groove 35b of rotor 10, this belt engaging with its opposite end 78 the groove 79b of the slide valve 76 of speed selector 75, thus compressing the detent-positioning spring 36. Thus, slide valve 76 is locked and motor 1 stopped.

The circuit pressure will then increase and can attain the maximum value (120 kg./cm.$^2$) necessary for operating the rotary actuator 52 without any possibility of causing an untimely operation of the slide valve 76 of speed selector 75, the latter remaining locked by the bolt 78 until the movable blade of the actuator has attained its high-speed extreme position. At this time the notch or groove 35 of the rotor registers with the end 33 of the bolt, the latter is pushed back by its spring 36 so that said end 33 engages said groove 35 registering therewith, its opposite end 78 being simultaneously disengaged from the groove 79b of slide valve 76. Thus the motor 1 revolves at high speed and the released slide valve 76 is no more subjected at 92 to the circuit pressure, except on the reduced end surface of its shouldered stud 93. Thus, the cycle may be resumed indefinitely.

As already explained hereinabove, the purpose of the monitoring selector 76 is to avoid the oil-feed reversal in the rotary actuator 52 during the reversal of the direction of rotation of motor 1 as a consequence of a corresponding actuation of the main distributor 62. In fact, as long as oil under pressure is fed through the pipe-line 60 according to the preceding hypothesis, the pressure thereof is exerted through the medium of duct 103 and orifice 101 of the monitoring selector on the free face of the right-hand extreme piston of slide valve 96 of said selector, thus holding this slide valve in the left-hand extreme position illustrated in FIGURE 11. Now if the oil circulation were reversed by operating a corresponding control member of the main distributor 62, the oil under pressure would flow through pipe-line 61 and act through the medium of line 102 and orifice 100 of the monitoring selector upon the opposite or free left-hand extreme face of the selector slide-valve 96, thus moving the latter to the right-hand extreme position in which port 88a is closed so that the oil under pressure will flow through the port 99, bore 97 and port 88b of the monitoring selector, and then through pipe line 84b to the branch line 90 and pipe line 84a, the oil forced by the actuator flowing through port 89, bore 97 and port 98 of the monitoring selector, and finally through the return line 60. Thus, the oil supply conditions and the direction of oil flow in the rotary actuator remain unchanged.

FIGURE 12 illustrates the diagram of the hydraulic circuit means controlling the infinitely variable-speed motor 1a with automatic monitoring of the speed change. In this case too and according to the operating conditions contemplated the motor 1a must always tend to revolve at high speed and must automatically reduce its working speed if its operating pressure increases, so that the useful motor output will remain constant, as a consequence of this automatic regulation, without requiring any action from the operator who must however have at his disposal manual means for controlling the automatic speed variation of the motor, for counteracting this variation if necessary.

As in the preceding diagram concerning the two-speed motor, the equipment also comprises in this case a speed selector 104 and a feed or monitoring selector 105.

The speed selector 104 is of the four-way type and comprises in addition a three-piston cylindrical slide valve slidably mounted in a bore 107 formed in the selector body, four pairs of ports 108a and 108b, 109a and 109b, 110a and 110b and 111a and 111b opening into this bore, as shown. The relative positions of these ports as well as the lengths and relative spacing of the three pistons of slide valve 106 are so calculated that in the left-hand extreme position of the slide valve the communication is established between ports 108a and 108b through bore 107, on the one hand, and between port 109a and port 109b through said bore 107, on the other hand, both orifices 110 and 111 being closed, and that in the right-hand extreme position of the slide valve the communication is established between ports 110a and 110b through said bore 107, and between ports 111a and 111B through said bore 107, and besides ports 108 and 109 are closed in this case. A limit stop 106a consisting for example of a circlip is mounted in a suitable inner groove in bore 107 in order properly to define the position of slide valve 106 for interconnecting ports 108a and 108b, 109a and 109b respectively.

The two pipe-lines or ducts 53 and 54 used mutually and alternatively for supplying oil to, and receiving oil from, the actuator 52a connects respectively the port 23 of said actuator to the port 108a of speed selector 104, and the other port 24 of said actuator to the port 109a of said selector.

The port 23 of said actuator and the pipe-line or duct 53 are also connected to the port 110a of the speed selector through the intermediary of a branch line 112, and the other port 24 of this actuator and the pipe-line or duct 54 lead to the port 111a of the speed selector through the medium of a branch line 113. Both ports 110b and 111b of the speed selector are interconnected by a by-pass line 114.

The speed selector 104 comprises means for adjusting the throughout of at least one of the two by-pass paths, preferably in the form of a throttling member 115 such as a needle valve adjustment screw or the like.

The ports 108b and 109b of speed selector 104 are connected to the monitoring selector 105 through lines 116 and 117, respectively.

In FIGURE 12 the slide valve 106 of speed selector 104 is shown in its left-hand extreme position and this selector comprises a return spring 118 mounted for instance in the bore 107 of said selector between the free left-hand end face of slide valve 106 and a preferably movable or adjustable stop member 119, said spring constantly urging the slide valve 106 to its right-hand end position wherein the actuator 52a is by-passed. Means for automatically varying the calibration or force of said return spring 118 are provided, these means being responsive to the momentary relative position of the rotor 10a of the actuator and acting preferably upon the movable spring stop member 119. To this end, this stop member constitutes a piston mounted in sliding fit and fluid-tight engagement in the cylindrical bore 107 at the left-hand extremity thereof and the body of the speed selector 104 has formed therein an orifice 120 opening into the left-hand end of bore 107 and connected through a duct 121 to the means for automatically varying the calibration or force of return spring 118. These means may advantageously consist of a feeler 122 in the form of a movable follower or the like, constantly urged against a cam or like member 123 solid with the rotor 10a of actuator 52a and having such contour and relative angular setting with respect to said rotor 10a that said follower 122 is engaged by the maximum swell or radius of said cam in the minimum-speed position of the rotor. The follower 122 is solid with a piston 123a movable in a cylindrical bore or chamber 124 of the stator 3 of said actuator 52a. A pipe-line 121 leads into this chamber 124 and registers with the free face of piston 123a through an orifice 125. Chamber 124, pipe line 121 and the space left between the movable stop member 119 and the left-hand end of bore 107 are filled with a suitable hydraulic liquid. Of course, the movable spring stop 119 could also be mounted in a separate cylindrical chamber of bore 107. On the other hand, the transmission between the movable follower 122 and the movable spring stop member 119, instead of being of hydraullic character as illustrated, may consist of mechanical electrical or any other equivalent means. Instead of utilizing an automatically adjusted stop member 119 an adjustable stop member having separate or independent control means, for example manual control means, may be used.

The body of the speed selector 104 comprises, adjacent its end opposite to the return spring 118 (the right-hand end as seen in FIGURE 12) a port 126 opening into the bore 107 beyond the right-hand free end face of slide valve 106 and connected through a pipe-line 127 to the monitoring selector 105.

The speed selector 104 comprises manual means for controlling its slide valve 106 and move same to its left-hand position corresponding to the minimum speed and acting preferably upon the right-hand limit stop member 128 of slide valve 106. To this end, this movable limit stop member 128 constitutes a kind of push member adapted to move the slide valve 106 and responsive either to direct mechanical means or, for example, according to the specific form of embodiment illustrated in FIGURE 12 to a single acting manual actuator 129. This actuator 129 comprises a piston 130 slidably mounted and in fluid-tight engagement in a cylindrical chamber 131, and solid with the push member 128 adapted to act with its free inner end on the right-hand free end face of slide valve 106. Leading into the chamber 131 is a port 132 connected through a pipe-line 133 to a manual pump or hydraulic press consisting of a cylinder 134 in which a piston 135 connected by its rod to a hand lever or the like 136 is slidably mounted. The chamber 131, pipe-line 133 and the free inner space of cylinder 134 being on the side of the operative end or face of piston 135 are filled with a suitably hydraulic fluid.

The monitoring selector 105 comprises two permanent passages 137, 138 connected respectively to the speed selector 104 and consisting for example of the extensions of pipe lines 116 and 117 passing through the body of the monitoring selector 105. The body of the monitoring selector 105 comprises a cylindrical chamber 139 having slidably mounted therein a valve piston 140 adapted to be moved to either of its opposite end positions in chamber 139. The longitudinal ends of the elongated chamber 139 communicate respectively with passage 137 (through a duct 141) and with passage 138 (through passage 142). On the other hand, the body of the monitoring selector 105 comprises an orifice 143 opening laterally into said chamber 139 and connected to pipe-line 127 leading to the aforesaid port 126 of speed selector 104. The length of chamber 139, the relative position of port 143 and the length of piston valve 140 are such that in each one of its endmost opposite positions said piston-valve 140 causes the port 143 to communicate with one of ports 141, 142 while closing the other.

As in the case of the two-speed motor described hereinabove the function of the monitoring selector 105 is to preserve the momentary direction of feed of the rotary actuator 52a irrespective of the direction of rotation of the motor 1a which is controlled by the main distributor 62.

As already explained hereinbefore, the rotor 10a of rotary actuator 52a is adapted to rotate through substantially 360° in either direction, whereby its movable blade 20 may contact one or the other face of the fixed blade 21. It will be assumed that the relative position of this movable blade 20 shown in FIGURE 12 (where it is diametrally opposite to the fixed blade 21) corresponds to the maximum-speed position, and that when said movable blade is so positioned as to engage either face of the fixed blade 21 the rotary actuator 52a is assumed to be in its minimum-speed position.

In this case the automatic monitoring system operates as follows, assuming again that the maximum pressure is set arbitrarily at 120 kg./cm.² In this example it will be assumed that the motor revolves at its minimum speed, in which case the movable blade 20 will contact the face 21a of fixed blade 21. Under these conditions the movable follower 122 is in its outermost position as a consequence of its engagement by the major swell or radius of cam 123, whereby the movable stop 119, as a consequence of the hydraulic pressure applied thereto by piston 123a, will compress the return spring 118, thus presetting this spring. The oil under pressure flowing through the passage 137 of the monitoring selector acts on the one hand through passage 141 upon the piston-valve 140, thus moving the latter to its right-hand end position, whereby the oil under pressure will flow through chamber 139, port 143, pipe-line 127 and port 126 into the bore 107 of speed selector 104 where it acts upon the adjacent end face of slide valve 106 to move same leftwards while compressing the return spring 118. Simultaneously, the oil under pressure from the passage 137 flows through pipe-line 116 and then through speed selector 104 (port 108b bore 107, port 108a) to the pipe line 53 and port 23 of the rotary actuator and thus into the compartment 19 thereof where it engages the face 20b of the movable blade to hold same in the initial position corresponding to the minimum motor speed. The oil forced by the movable blade flows through the other port 24 of the actuator, then through pipe line 54, port 109a bore 107 and port 109b of speed selector 104, pipe line 117 and passage 138 of the monitoring selector, thus returning to the reservoir along the line 61 and main distributor 62. Under these conditions, in the position of slide valve 106 shown in FIGURE 1, the feed and exhaust ports of the rotary actuator are open, the return spring 118 is compressed and the movable blade brought to and held in the minimum-speed position. This condition prevails as long as the oil pressure is substantially equal to the maximum pressure (120 kg./cm.²) this pressure being necessary for holding the slide valve 106 in its left-hand position.

With the motor operating under the above-defined conditions it will now be assumed that its operating pressure drops for example as a consequence of a decreasing load, to a mean value of, say, 60 kg./cm.². This pressure drop will involve a movement of the speed-selector slide valve 106 to the right due to the preponderant action of return spring 118 and also to the closing of ports 108 and 109 and the subsequent opening of ports 110 and 111. This causes the rotary actuator 52a to be by-passed by connecting its two compartments 18 and 19 directly with each other. As the movable blade 20 is no more held in its minimum-speed position by any pressure it will thus begin its free movement towards the maximum-speed position, i.e. a position diametrally opposite to the fixed blade 21a in the counter-clockwise direction of rotation as seen in FIGURE 12, since the natural or normal tendency of the motor 1a is to constantly revolve at maximum speed. This movement of the rotary actuator towards its maximum-speed position may be retarded at will by properly adjusting the throughput by means of the throttling screw 115 in the by-pass circuit, thus retarding at will the return of the movable blade 20 to its maximum-speed position.

Simultaneously, the movement of rotation of cam 123 rigid with the rotor 10a of actuator 52a by causing the gradual decrease in the radial polar distance of the cam contour, will permit the movement of piston 123a rigid with the movable follower 122 as a consequence of the oil pressure resulting from the movement of piston 119 acting as a movable stop member urged by the prestressed return spring 118, thereby partially expanding this spring by reducing the prestress thereof; as a consequence during a movement of rotation of actuator 52a towards the maximum-speed position, only a reduced oil pressure is required on the opposite free end face of slide valve 106 which registers with the port 126 of speed selector 104 for moving the slide valve 106 to the left; as a result, this slide valve 106 will resume its movement towards its left-hand position, that is, towards the minimum-speed position, as soon as the spring 118 is no more capable of counter-balancing the oil pressure applied to the opposite end face of slide valve 106.

During this movement towards the left-hand position (see FIGURE 12) slide valve 106 will first close ports 110 and 111 without inasmuch opening ports 108 and 109. Thus, the rotary actuator remains locked in an intermediate position and the motor 1a can revolve under constant rate conditions corresponding to an intermediate speed until its pressure either increases in which case the slide valve 106 will complete its movement towards the minimum-speed left-hand position (as seen in FIGURE 12), thus, returning the actuator to the minimum-speed end position, or decreases, in which case the slide valve 106 will return to its right-hand position corresponding to the maximum speed, thus restoring the by-pass circuit of the rotary actuator and causing the movement of this actuator towards its maximum-speed end position. The operating cycle may thus be resumed and repeated indefinitely.

The above-described device is capable of eliminating completely the leakage problem in the rotary actuator which is constantly fed with oil under pressure irrespective of its momentary position, this feature being particularly advantageous over conventional "closed-circuit" monitoring systems which on the other hand would not be applicable in the present instance considering the possible leakage output of a rotary actuator.

Besides, the manual control system 128 to 136 enables the operator to counteract at will either directly or from a distance (as illustrated in FIGURE 12) the movement of slide valve 106 to its right-hand position, that is, the normal tendency of motor 1a to revolve at maximum speed. This manual control, by moving the slide valve 106 to the left against the resistance of the antagonistic spring 118 causes fluid under pressure to be delivered to the rotary actuator and to move its movable blade 20 towards its minimum-speed position, even if at this time it tends to move in the opposite direction, that is, towards the maximum-speed position. A typical example of an application of this manual control may consist in the braking of an automotive vehicle equipped with a propulsion motor according to this invention when driving downhill. Furthermore, this manual control will give to the operator the illusion of a gradual braking of the motor due to the "harder" feeling observed when actuating the control lever 136, which is due to the action of cam 123 of the rotary actuator when the motor 1a tends to slow down, which is possibly comparable to the action exerted by the brake pedal in conventional automotive vehicles.

In FIGURE 12, it is assumed that the actuator is fed with fluid under pressure through pipe-lines 116 and 53, the return to the reservoir taking place through pipe-lines 54 and 117, whereby the movable blade 20 will tend to revolve in the clockwise direction, that is, as shown by the arrow in the drawing, to its minimum-speed position. Now, assuming that the direction of rotation of the main motor 1a, that is, the functions of pipe-lines 60 and 61, were reversed, the fluid under pressure fed through line 61 and passage 138 would flow on the one hand through duct 142 and thus move the slide valve 140 of monitoring selector 105 to the left, thus closing duct 141 and causing port 143 to communicate with port 142 through chamber 139, the actuator being fed in this case with oil under pressure through pipe-lines 117 and 54. The movable blade (from its initial, maximum speed position shown in FIGURE 12) would thus tend to move to the minimum-speed position in the counterclockwise direction, that is, in such a way that face 20b of said movable blade 20 will engage the face 21b of the fixed blade 21.

In the modified form of embodiment of the monitoring system of FIGURE 12 which is illustrated in FIGURE 13 the abutment 119' of the return spring consists of a a screw of which the longitudinal position in the cylindrical bore 107 can be adjusted manually, by more or less screwing same; in this alternative form of embodiment the rotor 10a is not provided with a cam for instance like the cam 123 of FIGURE 12, and the stator 3 has no movable follower (such as 122) actuated by said cam 123 and controlling the spring stop member. The position of abutment 119' and therefore the calibration force of spring 118 is not subordinate to the rotor position as in the case of the device illustrated in FIGURE 12.

In this FIGURE 13 it will be seen that this automatic monitoring system operates as follows, and that this operation differs considerably from that of the system shown in FIGURE 12.

It will be assumed that the maximum operating pressure is set at 120 kg./cm.², this value also representing the calibration force of the return spring adjusted at this value by manually rotating the adjustment screw 119'; it will also be assumed, in order to facilitate the understanding, that the motor revolves at its minimum speed or, in other words, that the movable blade 20 engages the face 21a of the fixed blade 21; in this position of blade 20, compartment 19 is fed with fluid under pressure, the latter flowing freely from 108 to 108a due to the fact that slide valve 106 is in its outermost left-hand position; with the motor thus revolving at its minimum speed, it will now be assumed that the operating pressure decreases, for example as a consequence of a decreasing load, whereby it will no more compensate or balance the force of spring 118. Slide valve 106 will move to the right, thus closing the communication between 108a and 108b and also between 109a and 109b; the movable blade 20 being no more retained against the fixed blade 21 in its minimum-speed position begins its free movement towards the maximum-speed position, that is, the position in which the movable blade 20 is diametrally opposite to the fixed blade 21; however, blade 20 stops at a first intermediate position corresponding to a first intermediate speed (which on the other hand will gradually evolve towards the high-speed position as a consequence of the leakage output). Thus:

(a) If the pressure then rises again as a consequence for example of an overload of the motor, for example to 120 kg./cm.², the slide valve will move to its endmost left-hand position and compressed hydraulic fluid will again be supplied to compartment 19, whereby the movable blade will again tend to move towards the low-speed position.

This reduction in the motor speed involves an increment in the output torque, whereby the pressure decreases and slide valve 106 is again moved to the right, however without attaining its endmost position on this side which corresponds to the bypassing of compartments 18 and 19, whereby the movable blade 20 will assume another intermediate position nearer to the low-speed position than its preceding intermediate position.

(b) As long as the pressure does not change sufficiently to move the slide valve to its endmost left-hand or right-hand position, the aforesaid first intermediate position is stable (or in other words practically stable for it constantly tends to change gradually towards the high-speed position due to the fact that this actually is its natural tendency, this movement being permitted by the existence of a fluid leakage output).

(c) If the pressure drops below a predetermined valve, for example 60 kg./cm.² as a consequence of, say, a load reduction, the slide valve will move to the right to its outermost position, and both compartments 18 and 19 will be by-passed and the movable blade 20 moved towards the position corresponding to its natural tendency, that is, its high-speed position; the torque then decreases as a consequence of the speed increment, the pressure rises and slide valve 106 is moved to the left to an intermediate position; the movable blade 20 will then occupy a third intermediate position nearer to the high-speed position than the preceding intermediate position.

Under those conditions, each time the fluid pressure drops to about 60 kg./cm.², slide valve 106 will occupy its outermost position at the right-hand end of its bore, and the movable blade will be moved to an intermediate position corresponding to a high speed, and each time the pressure increases to about 120 kg./cm.² this slide valve 106 will be moved to its left-hand extreme position and the movable blade to an intermediate position providing, or corresponding to, a lower speed; if the pressure variations remain within these limits, the slide valve movements will not change the communications established between the various ducts and ports, and the motor speed corresponding to the intermediate position of the movable blade will remain constant, with however a slight increase in the motor speed due to the leakage output.

The maximum use will thus be made of the rated power output of the pump feeding the motor, as contrasted with the corresponding monitoring system of FIGURE 12 wherein the motor is operated under decreasing power output conditions, as the pressure decreases and the speed increases.

In the monitoring system shown in FIGURES 12 and 13, the movement of the movable blade 20 takes place automatically but in the case of the system comprising manual means for adjusting the force of return spring 118, it is the torque variation resulting from the movement of the movable blade towards the low-speed position that involves a pressure reduction and therefore the movement of slide valve 106 to the right.

Of course, the present invention should not be construed as being limited by the specific forms of embodiment shown and described herein, which are given by way of example only and to which many modifications and variations may be brought without departing from the scope of the invention as set forth in the appended claims.

What I claim is:

1. A compressed-fluid device constituting a variable-speed reversible motor comprising a housing and a cylinder barrel rigid with an axial shaft and equipped with a first movable distributor-plate rigid with said barrel and said shaft and operatively connected to a general feed and return fluid circuit comprising feed and return lines, said barrel containing in cylindrical bores substantially parallel to the axis of said shaft reciprocating pistons cooperating with a swash plate having an annular and plane bearing surface inclined to the axis of said shaft and on which bear the heads of said pistons, said swash plate being rotatably mounted around a rotational axis perpendicular to said bearing surface on a support which is rotatably mounted around a stationary rotational axis on a part of said housing, both said rotational axis, said stationary rotational axis and the axis of said shaft being coplanar and intersecting at a point located substantially at the center of said bearing surface, and control means for rotating said support, said device being characterized in that said control means consist of a double-acting compressed-fluid actuator comprising an auxiliary feed and return fluid circuit comprising auxiliary feed and return lines, a rotary piston constituted by said support and a stator constituted by said part of said housing which is provided with a substantially cylindrical cavity in which said support is mounted in a fluid-tight manner, said rotary piston comprising a circumferential groove defining with the lateral wall of said cylindrical cavity an annular space constituting a working chamber divided in a fluid-tight manner into two compartments having respective volumes adapted to vary simultaneously in opposite directions by a movable radial blade rigid with said rotary piston and in fluid-tight sliding contact with said lateral wall and by a stationary radial blade rigid with said lateral wall and in fluid-tight sliding contact with said rotary piston, and said auxiliary feed and return fluid circuit comprising two input and output ports respectively for the ingress of and exhaust of fluid which are formed in said lateral wall and open into said compartments.

2. Device according to claim 1 usable as a multiple-speed motor characterized in that said lateral wall of said stator comprises a stationary stop member, substantially diametrally opposite to said stationary radial blade, so as to limit to about 180 degrees the permissible angular movement of said rotary piston, said stationary radial blade and said stationary stop member being substantially located in the plane formed by the axis of said shaft and said stationary rotational axis in such a manner that the stop positions of said movable radial blade on said stationary radial blade and on said stationary stop member correspond to two endmost inclinations of said bearing surface with respect to the axis of said shaft, locking means actuated by the pressure of said fluid being provided for locking said rotary piston in said stator for two endmost positions of said rotary piston corresponding to said two endmost inclinations so as to maintain constant the inclination of said bearing surface for said endmost positions and consequently to maintain two corresponding speeds of said shaft, that is a high speed and a low speed.

3. Device according to claim 1 usable as an infinitely variable-speed motor characterized in that it comprises on the one hand a second-compressed-fluid distributor plate coaxial to said first distributor plate and to said barrel, rotatably mounted in a bottom part of said housing having a bearing surface in contact with a bearing surface of said first distributor plate which is located between said barrel and said second distributor plate, and comprising ducts and ports adapted to supply said fluid to said cylindrical bores and to return said fluid therefrom independently of the angular position of said second distributor plate, and on the other hand transmission means connecting said rotary piston to said second distributor plate in such a manner that to any rotation of said rotary piston corresponds a rotation of same angle of said second distributor plate, said stationary radial blade being in a position corresponding to one of two endmost inclinations of said bearing surface when said movable radial blade is in any of its two stop positions on said stationary radial blade, the second of said two endmost inclinations corresponding to an angular movement of 180 degrees of said rotary piston from any one of said two stop positions in such a manner that said bearing surface may have any intermediary inclination between said two endmost inclinations and that, subsequently, the speed of the shaft may vary between a maximum speed and a minimum speed.

4. Device according to claim 3 characterized in that said transmission means comprise a first toothed wheel rigid with said rotary piston and coaxial to said stationary rotational axis, an auxiliary shaft revolving freely in said housing and carrying two pinions in meshing engagement respectively with said first toothed wheel and with a second toothed wheel rigid with said second distributor plate and coaxial to the axis of said barrel.

5. Device according to claim 1 characterized in that adjustable pressure means are provided for urging said stationary radial blade against said rotary piston.

6. Device according to claim 1 characterized in that it comprises a manually actuated main reversing distributor interposed in said general feed and return fluid circuit and having at least three positions of which one is a neutral intermediate position and two other are extreme active positions for controlling the rotation of said shaft in the two opposite directions, a pair of interconnecting calibrated overload valves branched off said respective feed and return lines between said first distributor plate and said main reversing distributor, said auxiliary feed and return lines being branched off said respective feed and return lines between said first distributor plate and said main reversing distributor and said auxiliary feed and return fluid circuit comprising a speed selector having at least two active positions permitting to permute the functions of said auxiliary feed and return lines.

7. Device according to claim 6, characterized in that said speed selector is manually actuated.

8. Device according to claim 7 characterized in that said speed selector has a neutral intermediate position corresponding to a fluid blocking in said auxiliary feed and return fluid circuit and permitting the obtainment of any intermediate speed between a maximum speed and a minimum speed.

9. Device according to claim 6 characterized in that said auxiliary feed and return fluid circuit comprises up-stream said speed selector a monitoring selector having two extreme active positions adapted to keep the direction of feed of said speed selector constant irrespective of the rotational direction of said shaft.

10. Device according to claim 9 usable as a multiple-speed motor characterized in that said lateral wall of said stator comprises a stationary stop member, substantially diametrally opposite to said stationary radial blade, so as to limit to about 180 degrees the permissible angular movement of said rotary piston, said stationary radial blade and said stationary stop member being substantially located in the plane formed by the axis of said shaft and said stationary rotational axis in such a manner that the stop positions of said movable radial blade on said stationary radial blade and on said stationary stop member correspond to two endmost inclinations of said bearing surface with respect to the axis of said shaft, locking means actuated by the pressure of said fluid are provided for locking said rotary piston in said stator for the two endmost positions of said rotary piston corresponding to said two endmost inclinations so as to maintain constant the inclination of said bearing surface for said endmost positions and consequently to maintain two corresponding speeds of said shaft that is a high speed and a low speed, said speed selector and said monitoring selector each comprise a slide-valve slidably mounted in a cylindrical cavity of a body and having three valve-forming pistons, the body of said speed selector comprises two ducts connecting it to said compartments, two extreme feed ducts and a return duct connecting it to the body of said monitoring selector, each extreme active position of said speed selector corresponding to the communication between a specific one of said extreme feed ducts and a specific one of said two ducts and to the communication between said return duct and the other of said two ducts, the body of said monitoring selector comprises, besides said extreme feed ducts and said return duct, the aforesaid auxiliary feed and return lines connected to said general feed and return fluid circuit, each extreme active position of said monitoring selector corresponding to the communication between a specific one of said extreme feed ducts and one specific of said auxiliary feed and return lines and to the communication between said return duct and the other of said auxiliary feed and return lines, a return spring is provided for resiliently returning said slide-valve of said speed selector to its extreme active position corresponding to said high speed of said shaft, a branch duct connects one of said extreme feed ducts to one of the ends of the cylindrical cavity of said speed selector, the structure of said branch duct being such that when the fluid pressure is higher than a limit value corresponding to the taring force of said return spring, said slide-valve of said speed selector moves against the action of said return spring for locating itself in the other of its extreme active positions, corresponding to said low speed of said shaft, the rotation of said shaft being discontinued during said movement of said slide-valve of said speed selector by means of the passage of the fluid through said pair of interconnecting valves calibrated for said limit value, auxiliary branch ducts establishing the communication between said auxiliary feed and return lines and the ends of the cylindrical cavity of said monitoring selector so as to permute the function of said auxiliary feed and return lines by a manual actuation of said main reversing distributor.

11. Device according to claim 10 characterized in that said locking means are constituted by a spring-loaded bolt located in cavities provided in the lateral wall of said stator and in the body of said speed selector and having two free ends and by two auxiliary grooves, provided in said rotary piston and so positioned as to face a first free end of said spring-loaded bolt for the two endmost positions of said rotary piston and thus to permit the introduction of said first end into the corresponding auxiliary groove and consequently to block the angular movement of said rotary piston, the structure of said free ends and of said auxiliary grooves being such that when said rotary piston is rotated, said first free end leaves said corresponding auxiliary groove whereas a second free end of said spring-loaded bolt is introduced in a subsidiary groove provided in one of said valve-forming pistons and remains in said subsidiary groove during the angular movement of said rotary piston, until said free end faces the other auxiliary grooves of said rotary piston.

12. Device according to claim 9 usable as an infinitely variable-speed motor characterized in that it comprises a second compressed fluid distributor plate coaxial to said first distributor plate and to said barrel, rotatably mounted in a bottom part of said housing, having a bearing surface in contact with a bearing surface of said first distributor plate which is located between said barrel and said second distributor plate, and comprising ducts and ports adapted to supply said fluid to said cylindrical bores and to return said fluid therefrom independently of the angular position of said second distributor plate, transmission means connecting said rotary piston to said second distributor plate in such a manner that to any rotation of said rotary piston corresponds a rotation of same angle of said second distributor plate, said stationary radial blade being in a position corresponding to one of two endmost inclinations of said bearing surface when said movable radial blade is in any of its two stop positions on said stationary radial blade, the second of said two endmost inclinations corresponding to an angular movement of 180 degrees of said rotary piston from any one of said two stop positions in such a manner that said bearing surface may have any intermediary inclination between said two endmost inclinations and that, subsequently, the speed of the shaft may vary between a maximum speed and a minimum speed, said speed selector comprising a slide-valve slidably mounted in a cylindrical cavity of a body and having three valve-forming pistons, the body of said speed selector comprising a first pair of ducts connecting it to one of said compartments and a second pair of ducts connecting it to the other of said compartments, two mutually interconnected ducts and two main ducts connecting said speed selector to said monitoring selector and passing through said monitoring selector for constituting the aforesaid auxiliary feed and return lines connected to said general feed and return fluid circuit, said monitoring selector comprising an inner chamber the ends of which are respectively connected to said main ducts and the lateral wall of which is connected by a branch duct to one of the ends of the cylindrical cavity of said speed selector, a piston-forming member being slidably mounted in said inner chamber for establishing the communication either between said branch duct and one of said two main ducts or between said branch duct and the other of said two main ducts, one of said extreme active positions of said speed selector corresponding to the communication between one of said two main ducts and one of said compartments and the communication between the other of said two main ducts and the other of said compartments, whereas the other of said two extreme active positions of said speed selector corresponds to the communication between said two compartments by the intermediary of one duct of said first pair of ducts, the cylindrical cavity of said speed selector, said mutually interconnected ducts and one duct of said second pair of ducts, and said speed selector comprising a return spring tending to urge said slide-valve to the one of said extreme active positions opposite to that of said extreme active positions towards which the compressed fluid circulating in said branch duct tends to move said slide-valve.

13. Device according to claim 12 characterized in that it comprises automatic controlling means for varying the calibration force of said return spring, said controlling means being pilot operated by the actual position of said rotary piston.

14. Device according to claim 13 characterized in that said automatic controlling means comprises two pistons respectively located in the ends of an auxiliary branch duct, one of said pistons constituting a stop element for the end of said return spring opposite to said slide-valve whereas the other of said pistons is rigid with a follower continuously applied against a cam member rigid with said rotary piston.

15. Device according to claim 13, characterized in that it comprises manual controlling means for varying the calibration force of said return spring.

References Cited

UNITED STATES PATENTS 2,847,938  8/1958  Gondek _____ 103—162
3,139,037  6/1964  Budzich _____ 103—162
3,304,886  2/1967  Roberts _____ 103—173

FOREIGN PATENTS 1,178,346  12/1958  France.

MARTIN P. SCHWADRON, *Primary Examiner.*

PAUL E. MASLOUSKY, *Examiner.*